United States Patent [19]

Humphrey et al.

[11] Patent Number: 4,933,846

[45] Date of Patent: Jun. 12, 1990

[54] NETWORK COMMUNICATIONS ADAPTER WITH DUAL INTERLEAVED MEMORY BANKS SERVICING MULTIPLE PROCESSORS

[75] Inventors: Donald J. Humphrey, Forest Lake; James P. Hughes, Lino Lakes; Wayne A. Peterson, Ramsey; Wayne R. Roiger, St. Michael, all of Minn.

[73] Assignee: Network Systems Corporation, Minneapolis, Minn.

[21] Appl. No.: 41,985

[22] Filed: Apr. 24, 1987

[51] Int. Cl.⁵ .................... G06F 13/00; G06F 13/24; G06F 15/16

[52] U.S. Cl. ............................ 364/200; 364/246.4; 364/243; 364/243.6; 364/231.4; 364/242.94; 364/242.95; 364/238.5; 364/240; 364/240.1; 364/270; 364/271.4; 370/85.1

[58] Field of Search ... 364/200 MS File, 900 MS File; 370/85

[56] References Cited

U.S. PATENT DOCUMENTS

| | | | |
|---|---|---|---|
| 4,034,347 | 7/1977 | Probert, Jr. | 364/200 |
| 4,164,787 | 8/1979 | Aranguren | 364/200 |
| 4,282,572 | 8/1981 | Moore, III et al. | 364/200 |
| 4,325,116 | 4/1982 | Kranz et al. | 364/200 |
| 4,371,929 | 2/1983 | Brann et al. | 364/200 |
| 4,400,770 | 8/1983 | Chan et al. | 364/200 |
| 4,403,282 | 9/1983 | Holberger et al. | 364/200 |
| 4,413,315 | 11/1983 | Kurakake | 364/200 |
| 4,438,493 | 3/1984 | Cushing et al. | 364/200 |
| 4,449,181 | 5/1984 | Young et al. | 364/200 |
| 4,470,114 | 9/1984 | Gerhold | 364/200 |
| 4,574,350 | 3/1986 | Starr | 364/200 |
| 4,613,935 | 9/1986 | Couleur | 364/200 |
| 4,633,434 | 12/1986 | Scheuneman | 364/900 |
| 4,652,993 | 3/1987 | Scheuneman et al. | 364/200 |
| 4,672,535 | 6/1987 | Katzman et al. | 364/200 |
| 4,680,753 | 7/1987 | Fulton et al. | 370/85 |
| 4,722,502 | 1/1988 | Scheuneman | 364/200 |

OTHER PUBLICATIONS

George Reyling, Jr., "Performance and Control of Multiple Microprocessor Systems", Computer Design, Mar. 1974, pp. 81-86.

Primary Examiner—Archie E. Williams, Jr.
Assistant Examiner—Emily Y. Chan
Attorney, Agent, or Firm—Orrin M. Haugen; Thomas J. Nikolai; Frederick W. Niebuhr

[57] ABSTRACT

A network communications adapter interconnects a plurality of digital computing resources for mutual data exchange in which a high performance, large capacity common memory is provided with a pair of external buses which allows multiple processors to store information in and read information from the common memory. The common memory is configured into two banks, each bank operating independently and concurrently under control of bus switching logic with separate address, control and data buses. The common memory typically provides 400 megabits per second of bandwidth to the multiple attached thirty-two and sixteen bit processors which may be coupled either to both buses simultaneously or individually to the two buses. The bus switching logic then allocates all of the available bandwidth to the individual processors coupled to the buses based upon a predetermined profile established at the time of system installation. Also included in the bus switch logic is circuitry for broadcasting a processor I.D., whereby only a particular processor assigned the same identifier will be afforded an access slot time during which communication over the dual bus structure can take place. One of the interconnected processors is designated as the node controller and it includes circuitry and software for implementing interprocessor interrupt handling and storage protection functions. Others of the plurality of processors coupled to the two memory buses provided input/output interfaces for host computers, digital peripheral devices, communications trunks or buses, or to wireless links for more remote communication.

4 Claims, 22 Drawing Sheets

NETWORK ADAPTOR BLOCK DIAGRAM

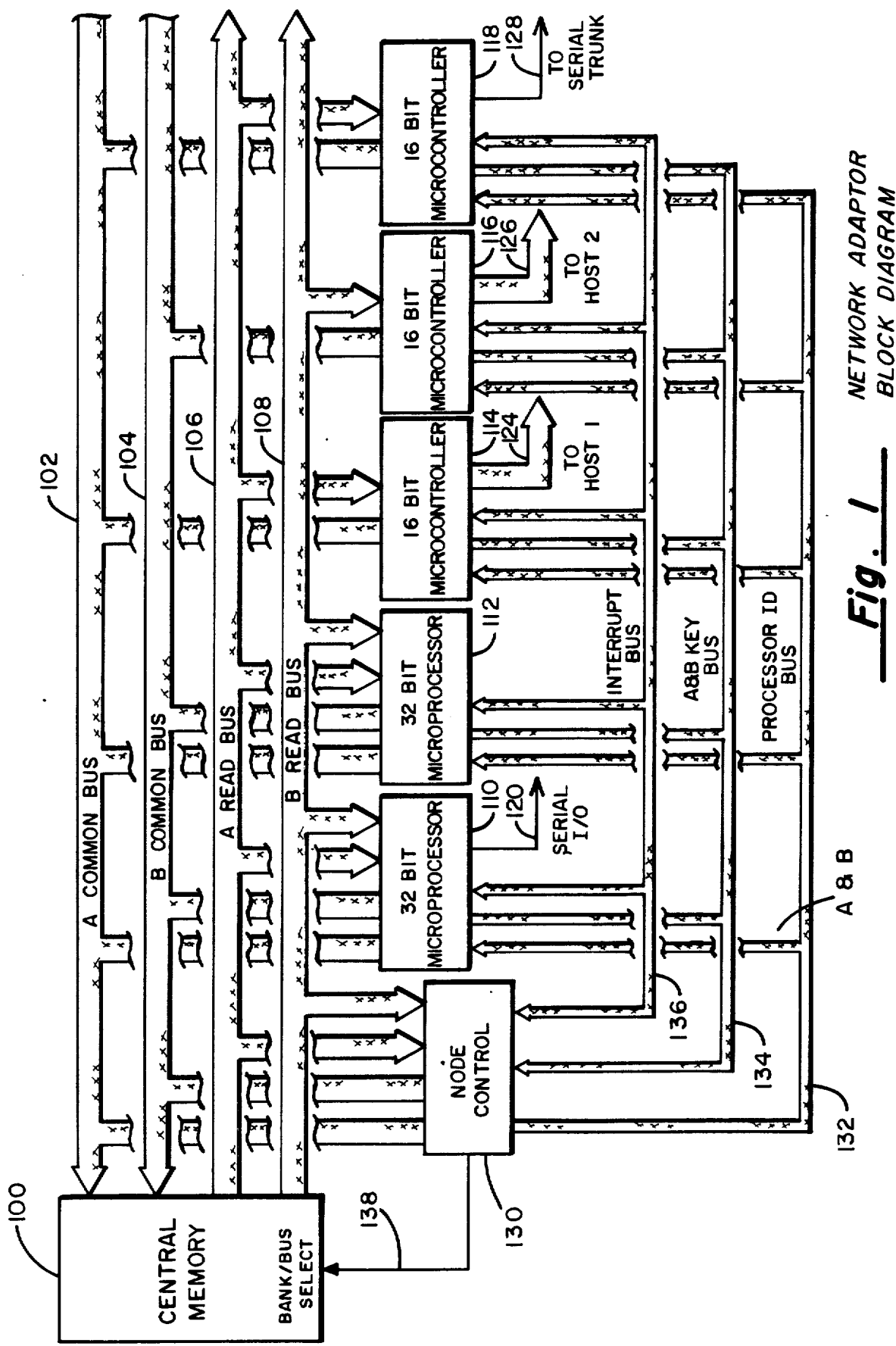
Fig. 1  NETWORK ADAPTOR BLOCK DIAGRAM

NODE CONTROL

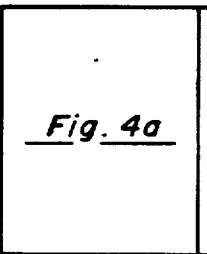 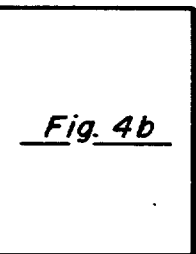
Fig. 4
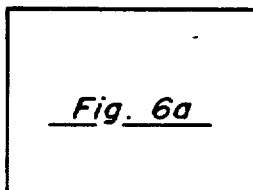 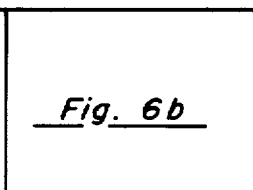
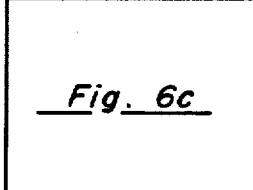 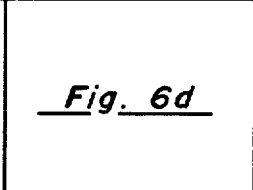
Fig. 6
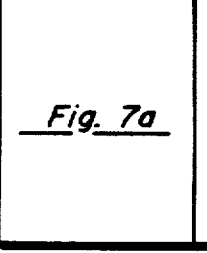 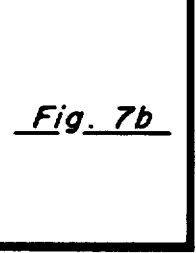
Fig. 7
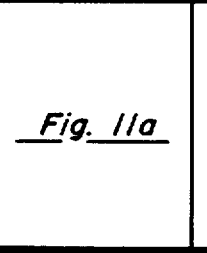 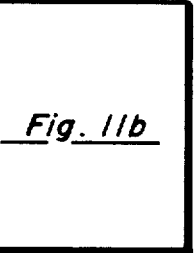
Fig. 11
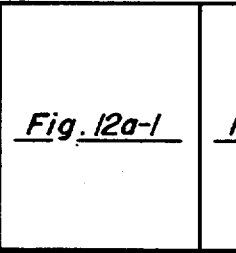 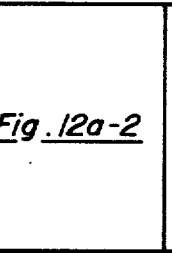 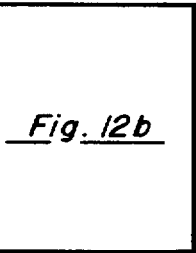
Fig. 12

CENTRAL MEMORY ARRAY BOARD

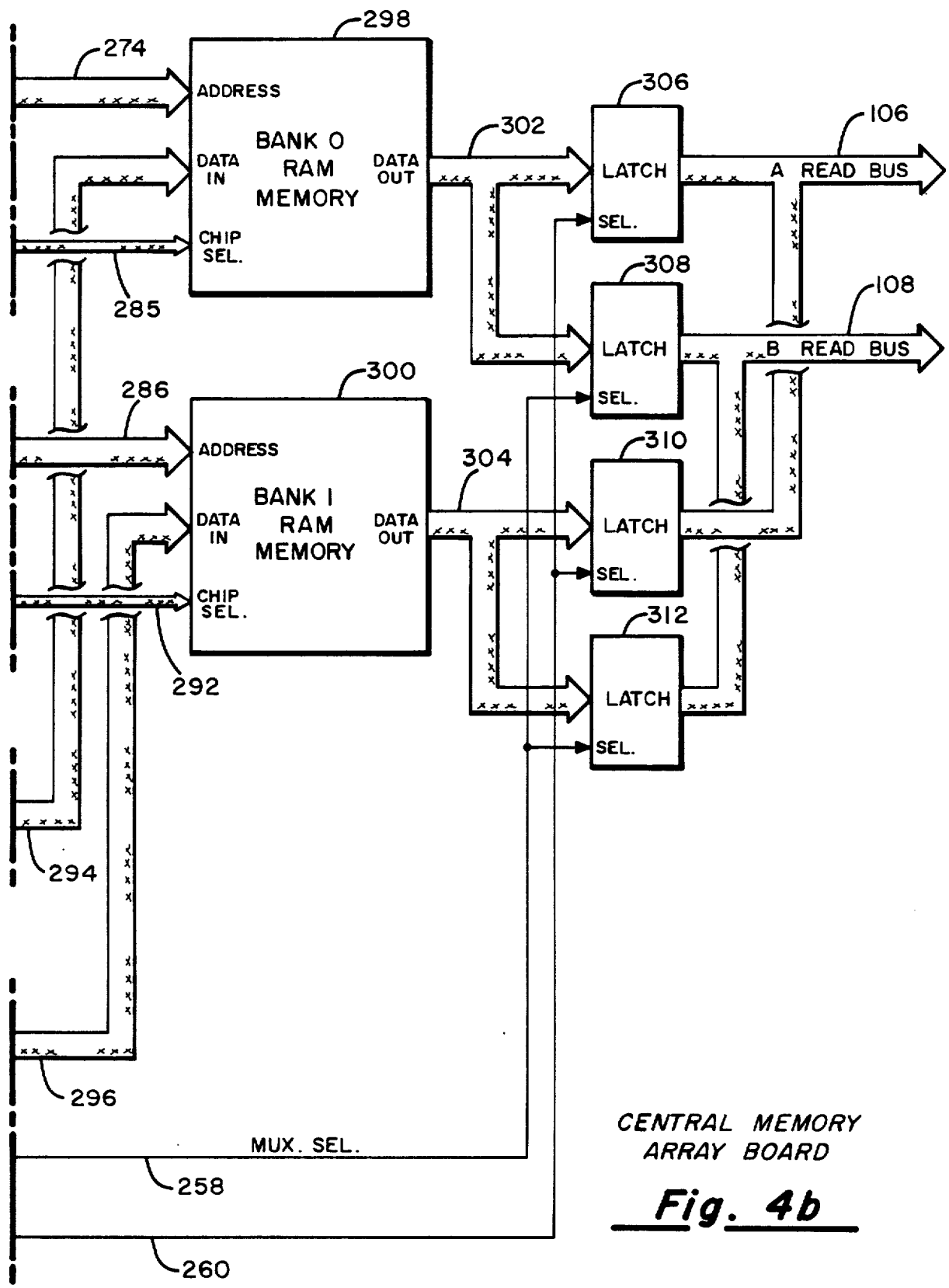

*32 BIT MICROPROCESSOR*

*16 BIT MICROPROCESSOR*

16 BIT MICROPROCESSOR

16 BIT MICRPROCESSOR

16 BIT MICROPROCESSOR

DIRECT MEMORY
ACCESS (DMA)

DIRECT MEMORY ACCESS (DMA)

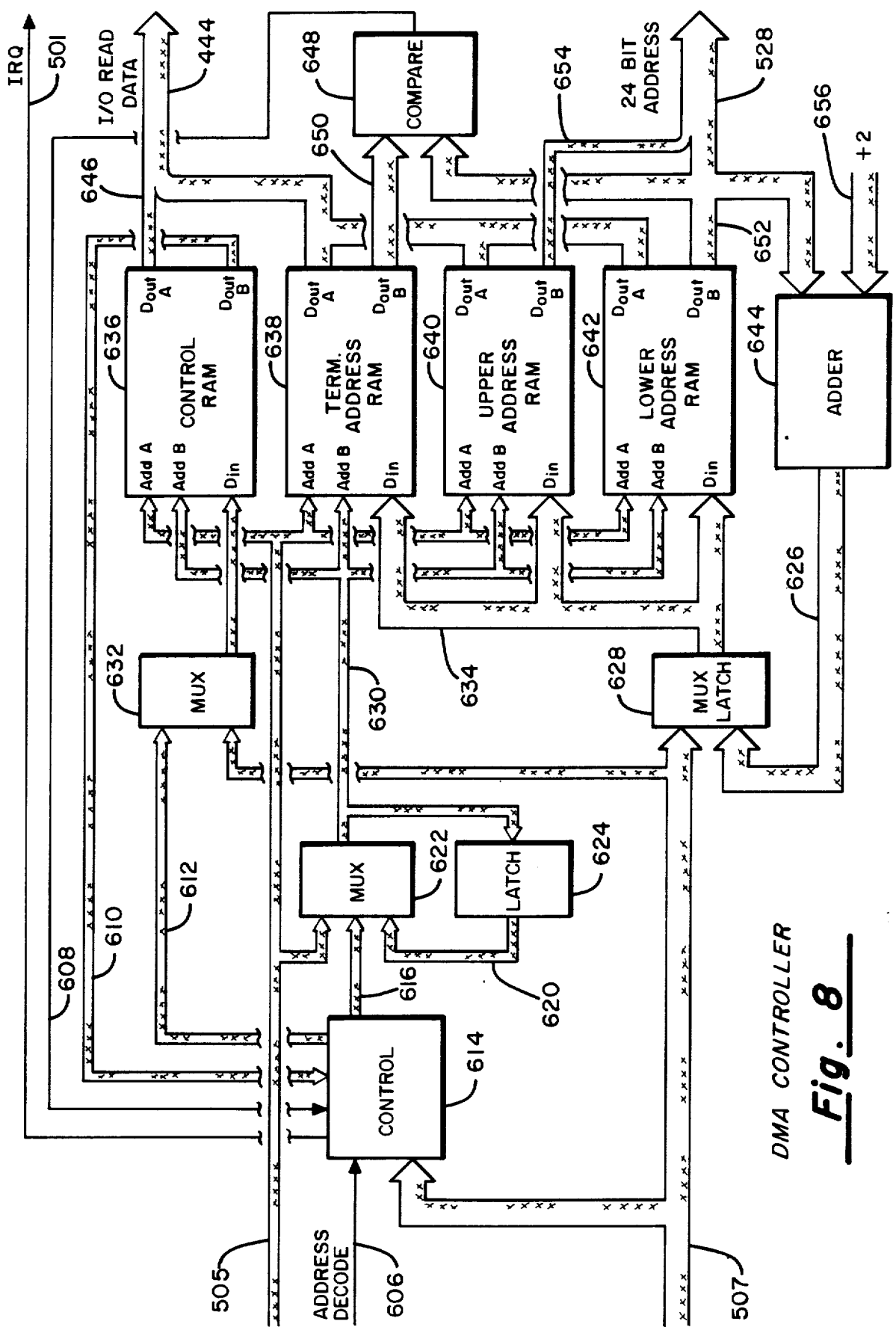
Fig. 8  DMA CONTROLLER

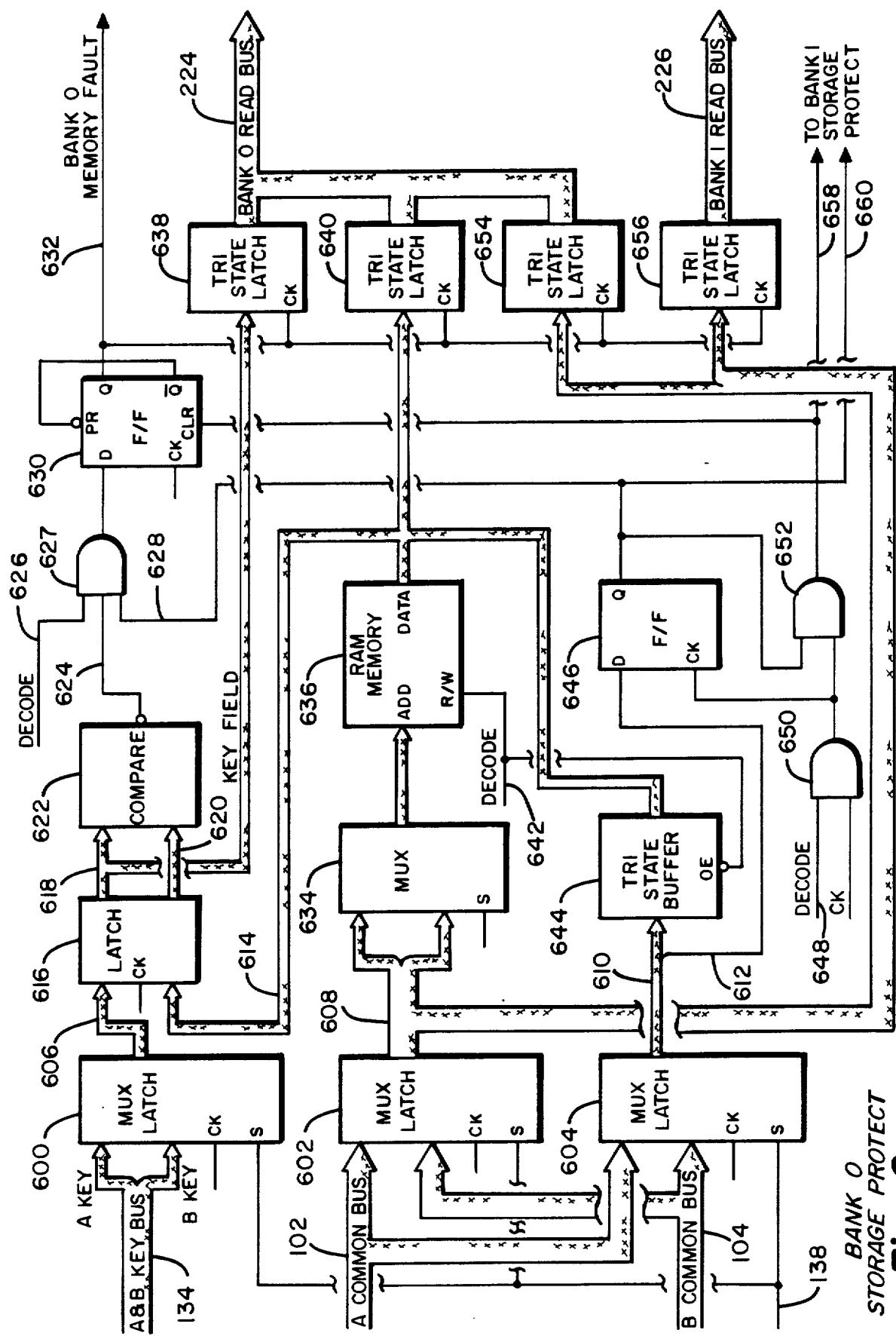

ACCESS CONTROL

INTERRUPT CONTROL

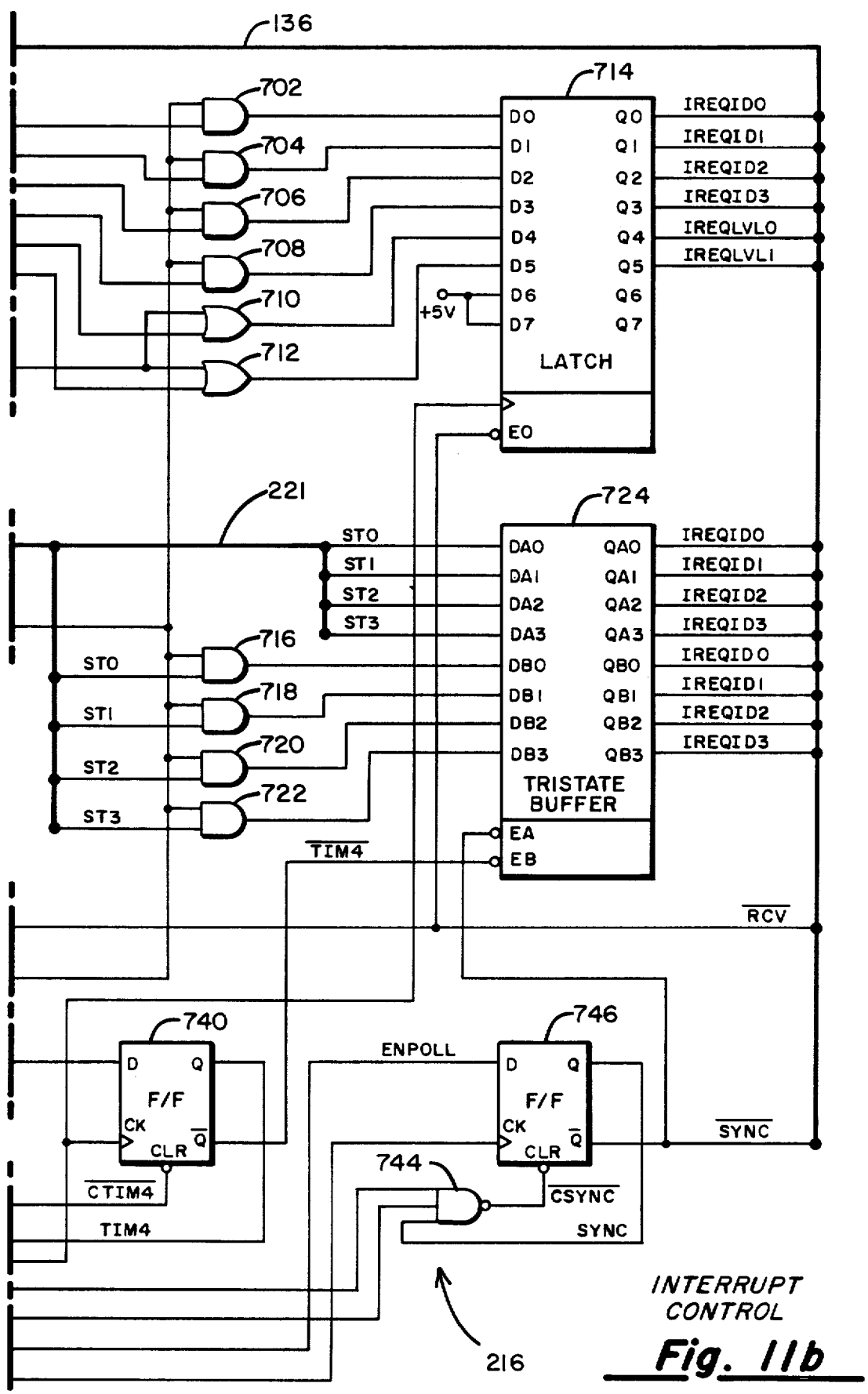
*Fig. 11b* INTERRUPT CONTROL

INTERRUPT PROCESSOR

DATA LINKAGE STRUCTURE

NETWORK COMMUNICATIONS ADAPTER WITH DUAL INTERLEAVED MEMORY BANKS SERVICING MULTIPLE PROCESSORS

BACKGROUND OF THE INVENTION

I. Field of the Invention

This invention relates to an improved type of network communications adapter of the type used to provide high speed digital communications between a multiplicity of computing resources both co-located and geographically dispersed.

II. Discussion of the Prior Art

Prior art network communications adapters generally comprise one or more nodes where such node is the digital interface circuitry required to connect a computing resource, such as a computer a printer, or a mass storage device to the network. The computers may range from a super computer, such as the Cray II, a 64-bit main frame computer to any one of a variety of present-day 16-bit minicomputers. A single node may also accommodate a multiplicity of slower devices, e.g., 8-bit personal computers and terminals. The device/node interface is typically a high-speed parallel interface exemplified by the IBM block multiplexer channel type of input/output.

Within a local geographical area, the communication media preferably comprises one or more multi-drop coaxial serial data links or, alternatively, fiber-optic serial data links. This local connection will hereafter be referred to as the "trunk". A complete communication network may be comprised of a multiplicity of trunks which are linked together by commercial common-carrier communication services, e.g., telephone company T1-type trunk line. The network communication adapter functions to provide a virtual connection between a device coupled to the node and another device on another node to which the first device can present a request to communicate. The functions of a network communications adapter, well understood in the prior art, are as follows.

Data from the adapter's host is received, on demand, in a continuous or intermittent stream of data. This data stream is divided into a sequence of data blocks. To each block of data is added a message header identifying the source and the destination of the data block and following the data block is a message trailer providing error correction information. The data block with its associated header and trailer is called a message packet. By means of controlled contention with other network adapters, the transmitting adapter gains access to the trunk and link network resources required to transmit the message packet to the destination adapter. Message packets from a multiplicity of sources are sent in a time division multiplex manner over a single serial trunk or link network medium. Each network adapter screens all messages present on its trunk(s) and captures only those messages whose address matches the identification number of the adapter node. Each received packet is checked for correctness, the receipt thereof is acknowledged to the sender, the header and trailer are stripped off and the data formatted and presented to the receiving host computer or other digital device coupled to the receiving adapter.

Various techniques to assure data integrity even in the presence of noise and other perturbations on the network are well known in the prior art. In an ideal communication network, all devices would be able to communicate freely with any other devices in the network at their maximum data rate. In a real network, however, the data rate limitations of the trunk establish an upper limit on the number and rate of messages which can be accommodated. Any communication between devices through the network consumes a portion of this aggregate bandwidth regardless of the geographical distance spanned.

It is one object of this invention to provide a multinode network adapter with a unique architecture which provides for very high data rate communication between the nodes of a given adapter without using the communication trunk, thereby conserving data bandwidth. With this invention, the aggregate data bandwidth of the network adapter can substantially exceed the aggregate bandwidth of the communication trunks employed.

In prior art communication systems, it is typically required that one of the host computers be designated as the network controller to manage or oversee message traffic across the entire network. The program which accomplishes this, the Network Executive, is generally run on a large main frame computer in a multi-tasking environment. For a large high performance network, the network executive can consume a significant fraction of the available computing capability of a relatively expensive main frame computer.

It is thus a further object of this invention to provide a novel communications adapter architecture in which a relatively inexpensive microprocessor can perform the network executive function.

It is a yet further object of this invention to provide a common, high-speed buffer memory which is shared by all of the node processors within a given network communications adapter.

A still further object of this invention is to provide a novel interrupt system which enables efficient coordination between the various node processors to facilitate the high speed flow of data messages.

Large telecommunication systems typically require a diverse range of communication interface hardware. One example might be a communications concentrator where a large number of slower speed devices are combined to appear as a single node on a communications trunk. In this case the channel bandwidth of the communications concentrator must be spread among a large number of interfaces. Another example is a "gateway adapter" which provides a communications bridge between two high-speed communication trunks. In this instance, all of the channel bandwidth is dedicated to a single communications path. In prior art systems, each type of communication device is typically a different product, each specialized to perform its particular function in the total system.

It is thus a yet further object of this invention to provide a network adapter which can be configured out of a common set of modular elements to perform a large number of different communications functions in that once configured, the aggregate channel bandwidth of the adapter can be selectively divided among various users to provide optimal throughput performance.

SUMMARY OF THE INVENTION

The foregoing objects and advantages are achieved by providing a communication network adapter having a random access buffer memory, which is partitioned into first and second independently and concurrently operating interleaved banks, and to which a plurality of processors may individually be coupled via first and second common buses which are selectively connectable, on an alternating basis, to the first and second banks to allow addresses and data to be transferred therebetween. In addition to the random access buffer memory, the network adapter also includes node control circuitry for synchronously and cyclicly connecting the first and second interleaved banks to the communication buses whereby a process slot I.D. number can be broadcast to all of the processors coupled thereto. As such, the available bandwidth of the communication buses is effectively allocated to the plural processors, but only the one of the processors having a matching I.D. number is capable of exchanging data with the buffer memory during a given time interval.

The communication network adapter of the present invention also includes an improved interrupt control arrangement in which interrupt identifier codes are generated in a timed sequence and transmitted over a separate interrupt bus to the plural processors. The processors, then, include circuitry for responding to an interrupt identifier code assigned to that given processor, allowing that processor to present an interrupt request and a processor identifier code identifying a particular processor which is to receive that request. Once an interrupt processor connected to the interrupt bus receives the interrupt request and an I.D. code for the destination processor, interrupt data is transmitted to the designated destination processor in accordance with an established priority assignment.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE DRAWINGS

FIG. 1 is a system block diagram of the network communications adapter of the present invention;

FIGS. 4a and 4b, when arranged as in FIG. 4 is a more detailed block diagram of the central memory portion of the block diagram of FIG. 1;

FIG. 8 is a detailed block diagram of the DMA controller used in the direct memory access circuitry of FIG. 7;

FIG. 9; is a detailed block diagram of the Bank 0 storage protection circuitry of the node control of FIG. 3;

FIGS. 11a and 11b when arranged as in FIG. 11,; is a detailed block diagram representation of the interrupt control of FIG. 3;

FIGS. 12a-1 and 12a-2 when arranged as shown in FIG. 12 show a detailed block diagram of the Interrupt Processor of FIG. 5.

DESCRIPTION OF THE PREFERRED EMBODIMENT

NETWORK ADAPTER SYSTEM

Figures 1, 12A:
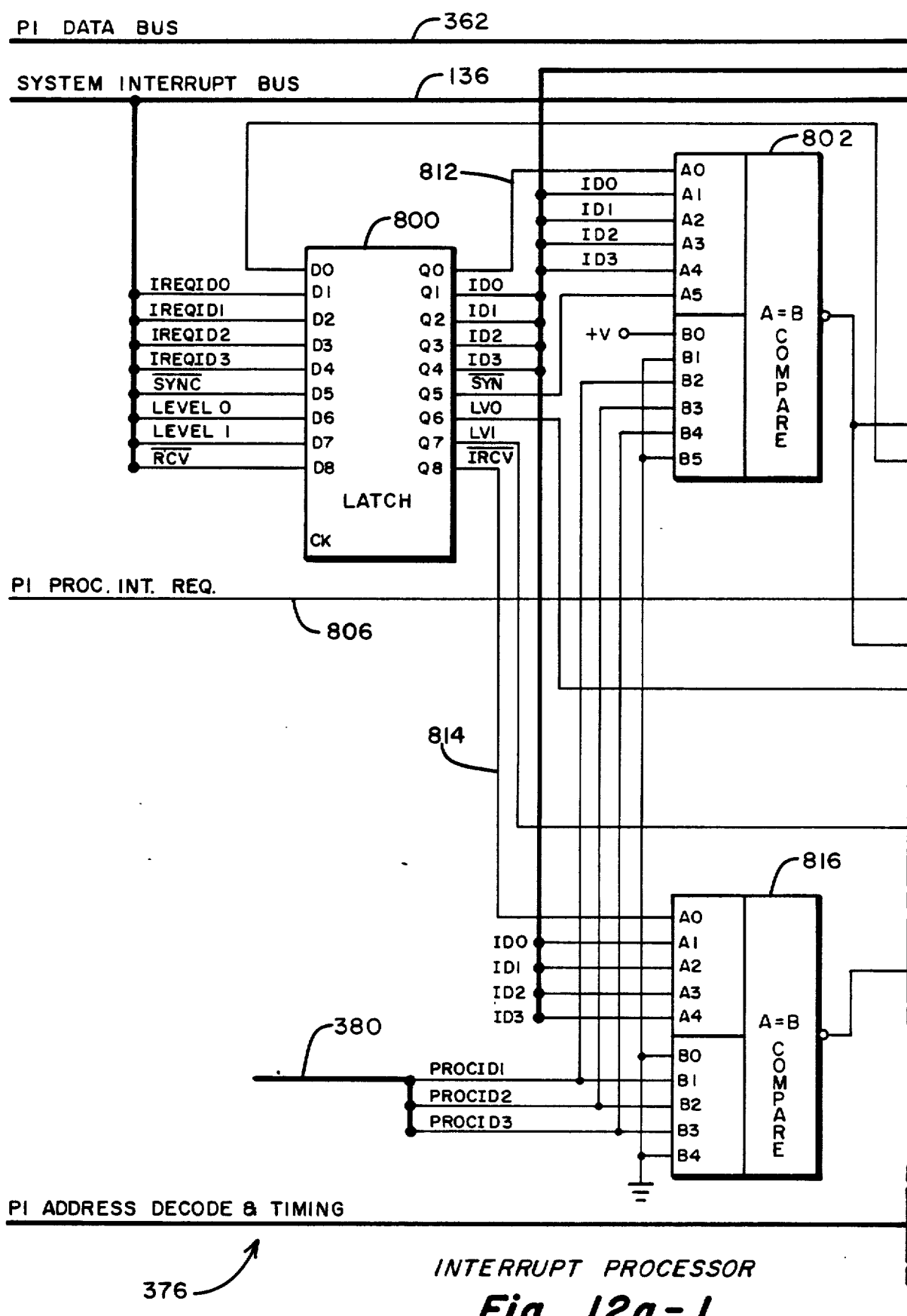

FIG. 1 shows a system level block diagram of the network adapter of the present invention. The hub of the adapter is Central Memory 100, which preferably may be a high speed static random access memory (SRAM) organized into two interleaved banks identified as Bank 0 and Bank 1. Communication between Central Memory 100 and all processors within the adapter is via buses 102, 104, 106 and 108. The common bus 102 will be referred to as the A bus and the common bus 104 will be referred to as the B bus. Each contains 24 lines which are time multiplexed to provide either a 24-bit address or 16-bits of write data to the central memory 100. The A "read" bus 106 and B "read" bus 108 each provide 16 bits of read data from the central memory 100. The state of the Bank/Bus select line 138 determines the connection of the A or B buses to the Central Memory 100. For example, when line 138 is low, the A buses 102 and 106 are connected to Bank 0 while the B buses 104 and 108 are connected to Bank 1. When line 138 is high, this connection is reversed.

The dual 16-bit architecture provides efficient coupling between the Central Memory 100 and a mix of 32-bit microprocessors, such as identified as numerals 110 and 112, and 16k -bit microcontrollers as at 114, 116 and 118. Microprocessors 110 and 112, along with microcontrollers 114 through 118, provide a typical example of how the network adapter of the present invention can be configured. This arrangement is to be considered illustrative only, and not limitive. Actually, the architecture accommodates any mix of processors, typically up to a total of 16. Each network has a 32-bit microprocessor, such as 110, dedicated to the internal control of the network adapter. This dedicated processor, hereafter referred to as the "Nucleus Processor", manages the routing of message traffic through the adapter, and particularly, manages the dynamic, page-by-page assignment of central memory space. Additional 32-bit microprocessors, such as that identified by 112, may be optionally added to perform specific application programs within the adapter, e.g., the aforementioned network executive function.

The 32-bit microprocessor functioning as the Control Processor has a dual RS 232-C serial I/O port 120 and 122 to which various peripheral digital devices may be connected in a conventional manner. Processors 114 through 118 may preferably be 16-bit high-speed bit slice microcontrollers in which the architecture and the firmware has been carefully tailored to provide efficient high speed I/O handling functions. In explaining one system configuration, processor 114 is assumed to be a Node Processor which is dedicated to a single, large-scale, high-speed digital computing device, here designated as "Host 1" Communication is via a 16-bit, bi-directional, high-speed parallel channel on bus 124. Processor 116 performs the same function for a second device designated as "Host 2", via parallel bus 126. Alternatively, a single processor might be configured to interface to a multiplicity of lower speed devices, such as printers or video displays. The 16-bit processor 118 provides a way of connecting the network adapter of the present invention to a network by way of a serial trunk line 128.

Processors 110 and 112 are shown as communicating with Central Memory 100 in a 32-bit mode by virtue of being concurrently connected to both the A and B buses. Each 32-bit transfer generally involves 16 bits from Bank 0 and 16 bits from Bank 1. Processors 114 and 118 are configured to communicate with Central Memory 100 in a 16k -bit mode via the A common bus while processor 116 is shown as communicating with Central Memory 100, via the B common bus.

An important feature of this network adapter architecture is that processors 114 and 116 may be simultaneously serviced during a given central memory cycle. Further, the dual bank architecture employed enables a 16-bit processor to write a contiguous block of data in Central Memory 100 which can be read contiguously by a 32-bit processor in spite of the disparity of word length. Similarly, data contiguously written in a 32-bit mode by either processors 110 or 112 can be contiguously read in a 16-bit mode by processors 114 through 118.

To maintain the highest possible data rate in and out of Central Memory 100, all data transfers are synchronous and under the control of Node Control logic 130. At the beginning of each memory cycle, Node Control 130 broadcasts the processor slot I.D. number of the processor designated to have access to either the A or B bus via bus 132. It contains two 4-bit processor slot I.D. codes, one associated with the A bus and the other associated with the B bus. The processor I.D. bus 132 also contains the state of Bank/Bus select line 138. At this point, it is necessary to understand that each of the processors has an established processor I.D. code which is determined by the setting of manual DIP switches within the processor and which are set at the time of system installation. When the processor slot I.D. codes broadcasted on bus 132 match a given processor I.D. code and address bit 01 corresponds to the state of the Bank/Bus select line 138, that processor may execute a memory transfer operation.

Each memory cycle has two phases. During the first phase, the enabled processor puts the memory address on the common bus. More particularly, thirty-two bit processors put identical addresses on both the A and B common buses 102 and 104 while 16-bit processors access only their dedicated common bus. During the second phase of the memory cycle, data from the addressed memory cell is read on either the A read bus, B read bus or concurrently on both A and B buses. Alternatively, in the event of a write cycle, the write data is placed on the respective common bus.

With this arrangement, both processors 114 and 116, or, alternatively, processors 116 and 118 might operate concurrently during a given memory cycle over their respective A and B buses. To accomplish this, Node Control 130 places the processor slot I.D. code associated with processor 114 on the A section of the slot processor I.D. bus and places the processor I.D. code associated with the processor 116 on the B portion of the slot processor bus.

Storage protection of Central Memory 100 is enforced by Node Control 130, such that each processor may only write into the pages of memory to which it has been given key access privilege. Node Control 130 maintains a table of processor access privilege, by page, in a RAM memory. This memory is initialized upon application of power and may be subsequently modified by the Nucleus Processor 110. Each processor and each DMA has a set of DIP switches which provide its key identity. Generally, each processor and DMA has its own processor I.D. but will share a common key I.D. when associated with one another. When enabled, 32-bit processors put their key I.D. code on both the A and B sections of key bus 134 while 16-bit processors place their key I.D. code on only that section of the key bus corresponding to the particular memory bus to which they are attached. If any processor attempts to write into a page of central memory 100 which is not assigned the identical A and/or B keys, this condition is detected by Node Control 130, which then generates a "memory fault" interrupt to Nucleus Processor 110, via the interrupt bus 136.

Interrupt bus 136 is a polled, bi-directional bus under the control of Node Control 130. When polled, each processor may direct a multi-level interrupt to any other processor in the adapter. End-to-end response time for any interrupt is guaranteed to be less than 5.2 microseconds providing an efficient, high-speed mechanism for coordinating the interoperation of the other network adapter processors.

MESSAGE FLOW

To help provide a context for the detailed description of the network adapter which will follow, it is instructive next to consider the overall operation of the system and, in particular, the manner in which data or messages flow through the system.

A message is passed from Host 1 to another device on serial trunk 128 in the following manner. Nucleus Processor 110 assigns buffer space for the message in the Central Memory 100. Microcontroller 114 contains direct memory access logic to transfer the incoming message from Host 1 to Central Memory 100 in the assigned space. Concurrently microcontroller 118 transfers data from the buffer space of Central Memory 100 to the serial trunk 128 using identical DMA hardware. Upon receipt of the command from Host 1 to transmit a message, microcontroller 114 interrupts Nucleus Processor 110 which assigns buffer space in Central Memory 100 and sets the storage protect table in Node Control 130 to enable write access by microcontroller 114. Nucleus Processor determines, by means of a routing table, which microcontroller will be the destination or route of the message. The designated microcontroller is interrupted and provided with a pointer to the buffer area of Central Memory 100 where the outbound message is assembled. The software and hardware control structure is arranged to enable a large number of concurrent messages to be processed. As already indicated, a network adapter in accordance with the present invention, may be comprised of typically up to 16 processors where each processor may handle a multiplicity of concurrent or interleaved messages. Limitation to this number, however, should not be inferred. A detailed description of how message flow is controlled is provided in a following section titled "Software Control Structure".

SYSTEM TIMING

Figure 2A:
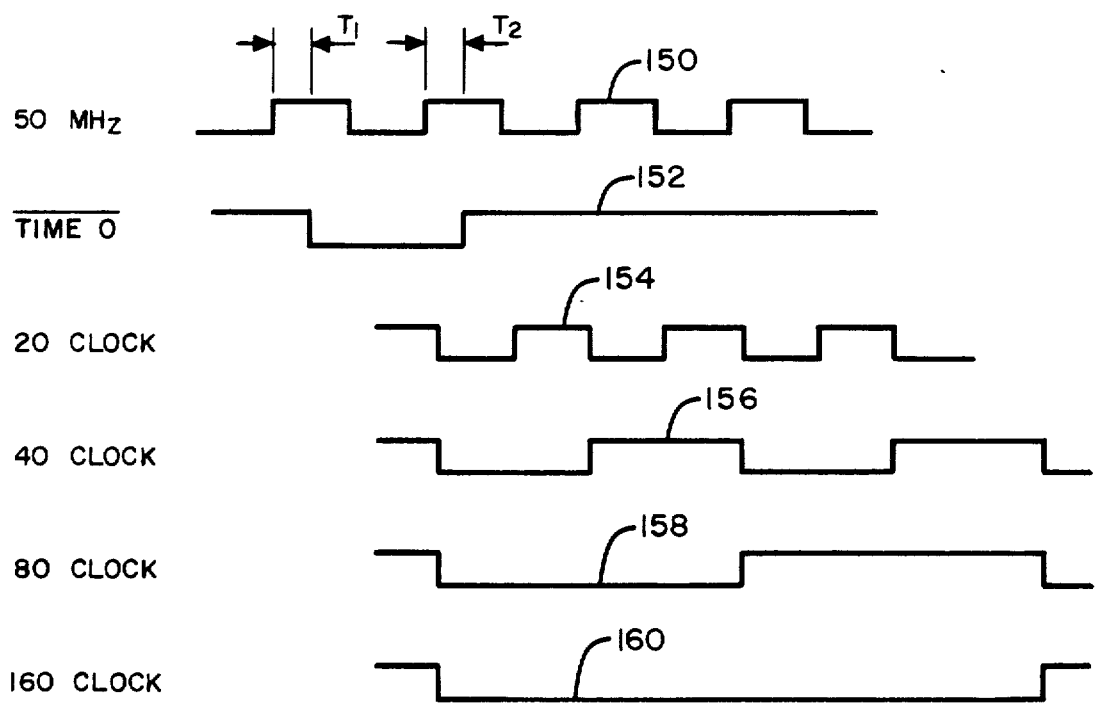
FIG. 2a and FIG. 2b are waveforms illustrating the timing signals required for operation in the system of FIG. 1.
Figure 2B:
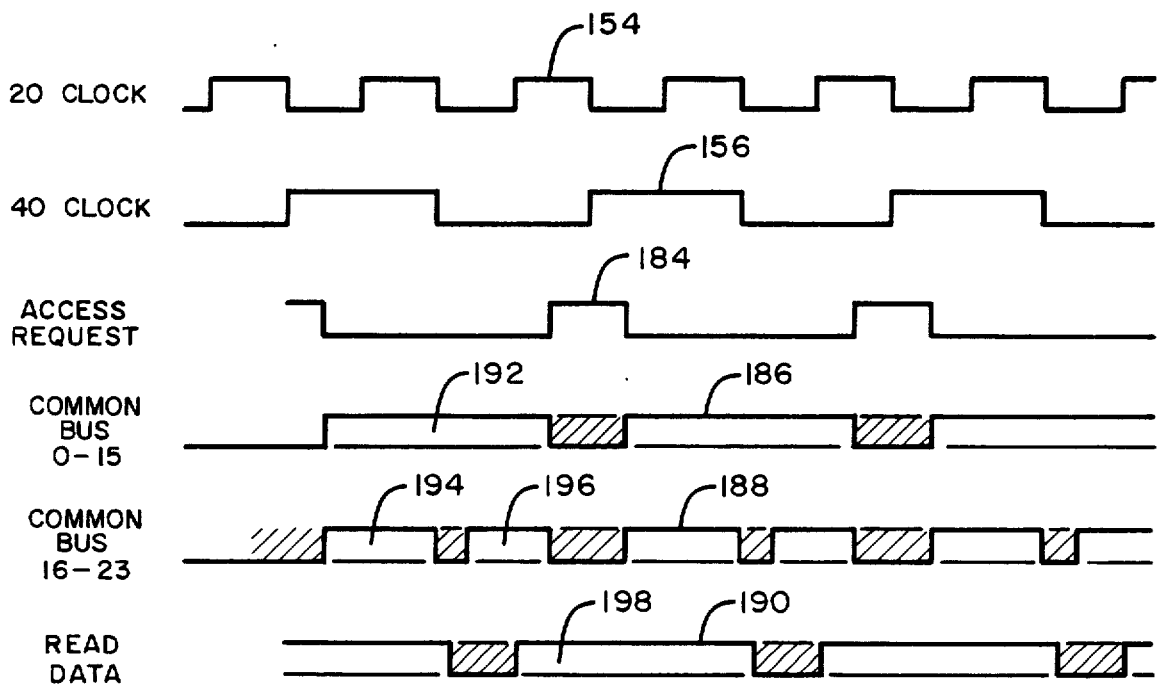

FIGS. 2A and 2B show typical timing signals required for operation of the network adapter. The source of all adapter timing is a single 50 MHz crystal controlled oscillator in node Control 130. This signal is broadcast to Central Memory 100 and all processors as the 50 MHz clock 150. Node Control 130 also broadcasts a second signal, the time 0 signal, 152. Care must be taken in the fanout and distribution of these signals to maintain an acceptable range of delay times, T1 and T2, and to further minimize the skew between clock signals arriving at different points in the system. An acceptable variation in the delay time for times T1 and T2 is from 4 nanoseconds minimum to 16 nanoseconds maximum. From the signals 150 and 152, each section derives four other clock signals, identified in FIG. 2A as 154–160, which will be referred to hereafter as the "T 20" clock, "T 40" clock, "T 80" clock and the "T 160" clock, respectively. Care must also be exercised in the fanout and distribution of these last mentioned clock signals to minimize skew relative to the 50 MHz clock so as to assure reliable synchronous operation.

The T 20 clock and T 40 clock are used to derive the central memory timing signals shown in FIG. 2B. The "Access Request" signal 184 controls the initiation of a memory cycle. Signal 186 shows the typical waveforms of the higher order bits 16 through 23 of the common bus. The unshaded region 192 shows the period of the memory cycle in which the address information is valid. Similarly, signal 188 shows typical waveforms on the lower order bits 0–15 on the same bus. It should be recalled that 16 bits of data are time multiplexed with the lower 16 bits of the address. Thus, unshaded region 194 shows the time during which the address information is valid while unshaded region 196 shows the time that write data information is valid. Waveform 190 shows the typical signals appearing on the read data bus. The unshaded region 198 indicates valid read data for the memory address identified during the address period indicated by region 194. Typical timing which should be maintained relative to the T 40 clock to assure reliable operation is shown in Table I below.

TABLE I

|  | MINIMUM | MAXIMUM |
|---|---|---|
| REQUEST on time after T 40 CLOCK | 6 | 26 |
| ADDRESS on time after T 40 CLOCK | 6 | 26 |
| COMMON BUS on time after T 40 CLOCK | 6 | 26 |
| READ DATA on time after NOT T 40 CLOCK | 4 | 26 |
| REQUEST off time before T 40 CLOCK | 20 | 0 |
| ADDRESS off time before T 40 CLOCK | 20 | 0 |
| COMMON BUS off time before T 40 CLOCK | 20 | 0 |
| READ DATA off time after T 40 CLOCK | 4 | — |
| COMMON BUS split time after NOT T 40 CLOCK | 0 | 14 |

CHANNEL BANDWIDTH ALLOCATION

Since the network adapter is intended to efficiently interconnect devices having diverse I/O channel data rates, it is desirable to be able to allocate the aggregate channel bandwidth selectively among the various processors. This is accomplished through a fixed rotational assignment of time slots to each of the processors. Table II shows a hypothetical assignment of six processor I.Ds. to the eight available time-slots. In the example, it is assumed that a total bandwidth of 200 megabits per second is available for each of the A bus and the B bus and that a minimum allocation for a processor or I/O DMA device is 25 megabits per second. A 32-bit processor is connected as in FIG. 1 to both the A and the B buses and carries a processor I.D. of 0 and 1, respectively, for the two 16-bit ports. A 16-bit processor with a processor I.D. of 2 is connected only to bus A and, Similarly, a 16-bit processor with a processor I.D. of 3 is connected only to bus B. I/O DMA devices having processor I.D. numbers of 4 and 5 are connected individually to the A bus and B bus, respectively. Further, it is assumed that the P1 processor is allocated 50 megabits per second of the available bandwidth on bus A and 50 megabits per second of the available bandwidth on bus B and that processors 2 and 3 also are allocated 50 megabits per second. The two I/O DMA devices are assumed to each have a 100 megabits per second allocation. This, then adds up to the available 200 megabits per second total available bandwidth for both buses A and B.

TABLE II

| TIME SLOT | BUS A | BUS B | BANK NO. |
|---|---|---|---|
| 1 | 0 | 1 | 0 |
| 2 | 4 | 5 | 0 |
| 3 | 2 | 3 | 0 |
| 4 | 4 | 5 | 1 |
| 5 | 0 | 1 | 0 |
| 6 | 4 | 5 | 0 |
| 7 | 2 | 3 | 1 |
| 8 | 4 | 5 | 1 |

Each time-slot corresponds to one central memory cycle time, which is nominally 80 nanoseconds. Thus, the total time for the entire 16 time slots is 1.28 microseconds. This means that each time a processor gains access to one of the 16-bit buses A or B in a given time slot, it provides a channel data rate of 25 megabits per second. The aggregate data rate for all 16 time slots and both A and B buses is 400 megabits per second. In this hypothetical example, processor 1, a 32-bit processor, is shown as connected to both bus A and bus B and is granted access in time slots 1 and 5, thus providing a total channel bandwidth of 100 megabits per second. It should be noted that for 32-bit processors, the lower 16 bits of data are always connected to Memory Bank 0 and the upper 16 bits of data are always connected to Bank 1. Processor 2 is assumed to be a 16-bit processor and is connected only to bus A and is granted time slots 3 and 7, providing a 50 megabit data rate. Processor 3 is illustrated as a 16-bit processor and is connected only to bus B. It is allocated time slots 3 to communicate with Bank 0 and time slot 7 to communicate with Bank 1. Memory Banks 0 and 1 are switched between buses A and B by the aforementioned Bus/Bank select switch 138. Processor 4 is shown as a 16-bit processor arbitrarily connected only to bus A. It, along with processor 3, is allocated time slots 2, 4, 6 and 8, each processor accessing a different bank, i.e., processor 4 to Bank 0 during slot 2 and 6 and to Bank 1 during slots 4 and 8. In this way, memory exchanges between the Central Memory 100 and processors 4 and 5 can be interleaved, with each processor granted a 100 megabit per second bandwidth. One restriction which must be observed is that each 16-bit processor must be given at least two time slots, one in which to access Bank 0 and one in which to access Bank 1. A 32-bit processor, since it simultaneously accesses both banks, may be allocated as little as one time slot.

NODE CONTROL

Figure 3:
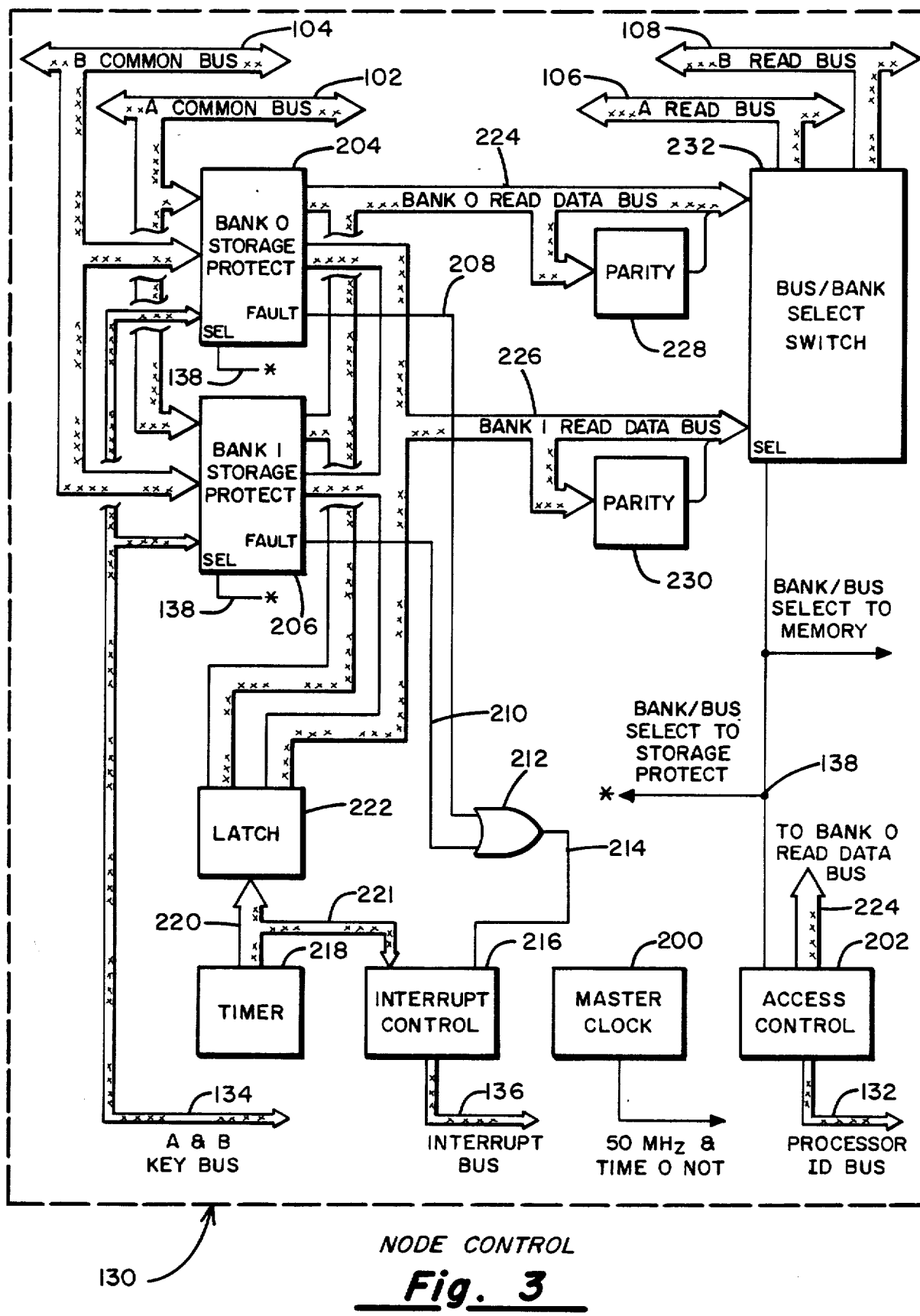
FIG. 3 is a more detailed block diagram of the node control circuitry in the block diagram of FIG. 1.

FIG. 3 shows a more detailed block diagram of the Node Control circuitry 130 in FIG. 1. Access Control circuit 202 provides a sequence of processor slot I.D. codes on processor slot I.D. bus 132 to establish the processor time slot bank allocations as in the previously described example. As will be explained in greater detail later on, the Access Control circuit 202 provides a system of manually-operated switches to define the specific time-slot allocations. Each potential configuration of time-slots is called a "profile" and up to 16 different profiles may be defined with the switches. The current state of the profile selection switches may be determined by the Nucleus Processor 100, via the Bank 0 read data bus 224.

Figures 2, 12A:
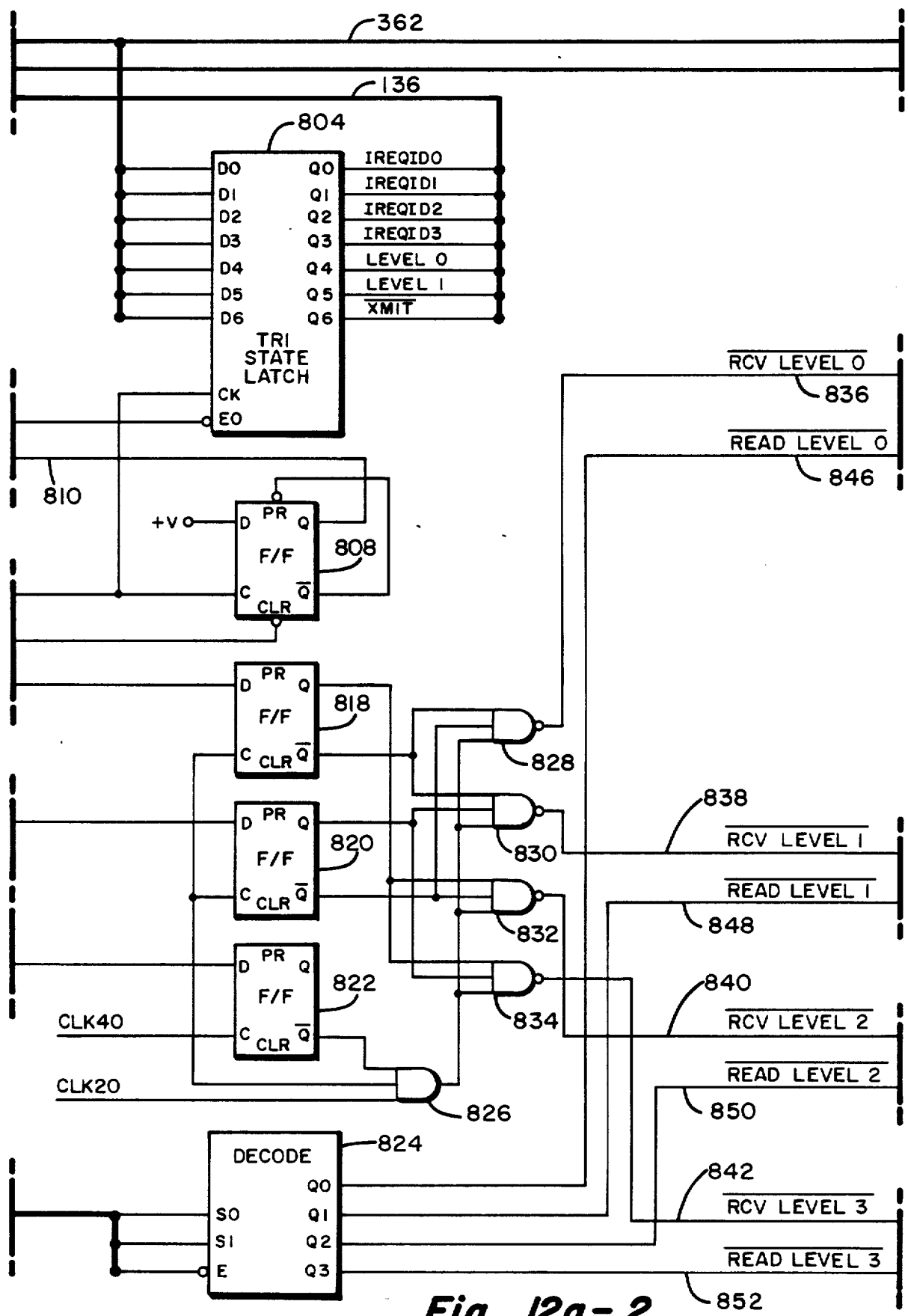
Figure 12B:
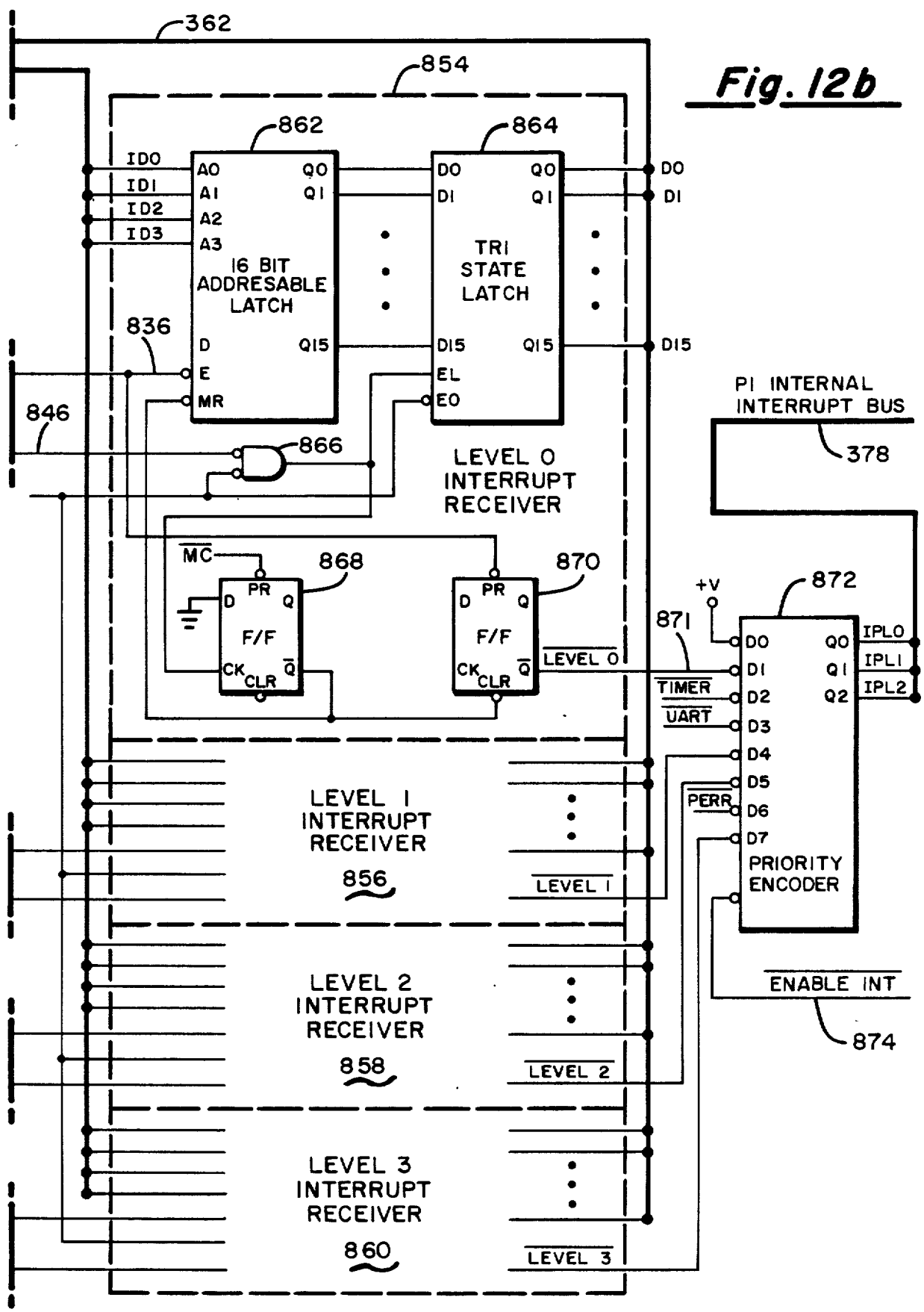

Master clock circuitry 200 generates the 50 MHz clock and the $\overline{\text{time 0}}$ signal, which was described in conjunction with FIG. 2. It is a signal which is broadcast to all processors and to Central Memory 100.

Since Bank 0 and Bank 1 may be connected to different 16-bit processors, it is necessary to have separate storage protection logic for each bank, i.e., "Bank 0 Storage Protect" 204 and "Bank 1 Storage Protect" 206. Each such logic circuit performs a test of the address range on one of the common buses per the key code provided on the A and B key bus 134. If the Bus/Bank select line 138 is low, the Bank 0 Storage Protect 204 compares the address on A Common bus 102 to the A section of A & B Key bus 134 while the Bank 1 Storage Protect 206 compares the address on B Common bus 104 to the B section of the A & B Key bus 134. A memory fault in either Bank 0 or Bank 1 will activate OR gate 212, via lines 208 or 210, to generate a forced interrupt by interrupt control circuit 216.

Timer 218 is a 32-bit counter clocked at a 160 ns rate which thereby provide a precision timing reference for all adapter processors. A parallel output of the timer is provided on bus 220 which is latched during a memory read cycle in latch 222. The lower 16 bits of timer data are presented on the Bank 0 Read Data bus 224 while the upper 16 bits are presented on Bank 1 Read Data bus 226.

Byte parity is generated and added to these data buses by parity generators 228 and 230. The Bus/Bank Select Switch 232 allows either bank of data to be routed to either the A or B Read buses 106 or 108, respectively. This arrangement means that a 32-bit processor spanning both buses can read the entire 32 bit timer data in a single memory cycle or, alternatively, a 16-bit processor connected to only one read bus can read the same timer data in two consecutive 16-bit memory references. The timer is read by accessing the 32-bit content of address $00810000_H$. The 24-bit address responsible for the fault is latched in either circuitry 204 or 206. A read of address $00810040_H$ will cause the address latched in circuit 204 to be presented on buses 224 and 226, the lower 16 bits on bus 224 and the upper 8 bits on bus 226. Similarly, address $00810042_H$ provides access to the Bank 1 Fault address, via the same path. A read of address $00810020_H$ provides the status of the profile switches of access control 202, via bus 224. The lower four bits of timer 218 are made available over path 221 and are used by Interrupt Control Circuitry 216 to sequentially poll the processors for interrupts, via Interrupt bus 136.

CENTRAL MEMORY

Referring again to the system block diagram of FIG. 1, the Central Memory 100 is composed of 1 to 4 identical memory array boards. Each memory array board contains all of the buffer and decode circuitry necessary to communicate directly with the A and B common buses 102 and 104 and the A and B read bus 106 and 108.

In the preferred embodiment being described, each memory array board contains 524,288 bytes of high-speed static RAM memory. The memories are arranged in two banks, Bank 0 and Bank 1. Each bank may contain 131,072 18-bit words, which are accessable to any of the A/B buses 102-108. Of these 18 bits, 16 are data and 2 are for byte parity. The parity is neither generated nor checked on the memory board but is stored, as received, on the data bus. Memory addressing within the array is sequential through the banks. Sixteen-bit sequential words are accessed by alternate Bank 0 and Bank 1 references, i.e., interleaved mode of operation. Thirty-two bit words are accessed by concurrent reference to both Bank 0 and Bank 1.

The memory array may be accesses in either word mode or byte mode. Bank selection and upper/lower byte selection is accomplished by the memory address. Word/byte mode selection is indicated by a separate control line. Bit 0 of the address selects the byte if byte mode is selected. If bit 0 is a "1", the lower byte 1 is selected. If bit 0 is a "0", the upper byte 0 is selected. Bit 1 of the address is the Bank Request bit. If bit 1 is a "0", Bank 0 is requested. If bit 1 is a "1", Bank 1 is requested. Address bit 2 through 19 select one of the 262,144 bytes in each bank.

CENTRAL MEMORY ARRAY BOARD

Figure 4A:
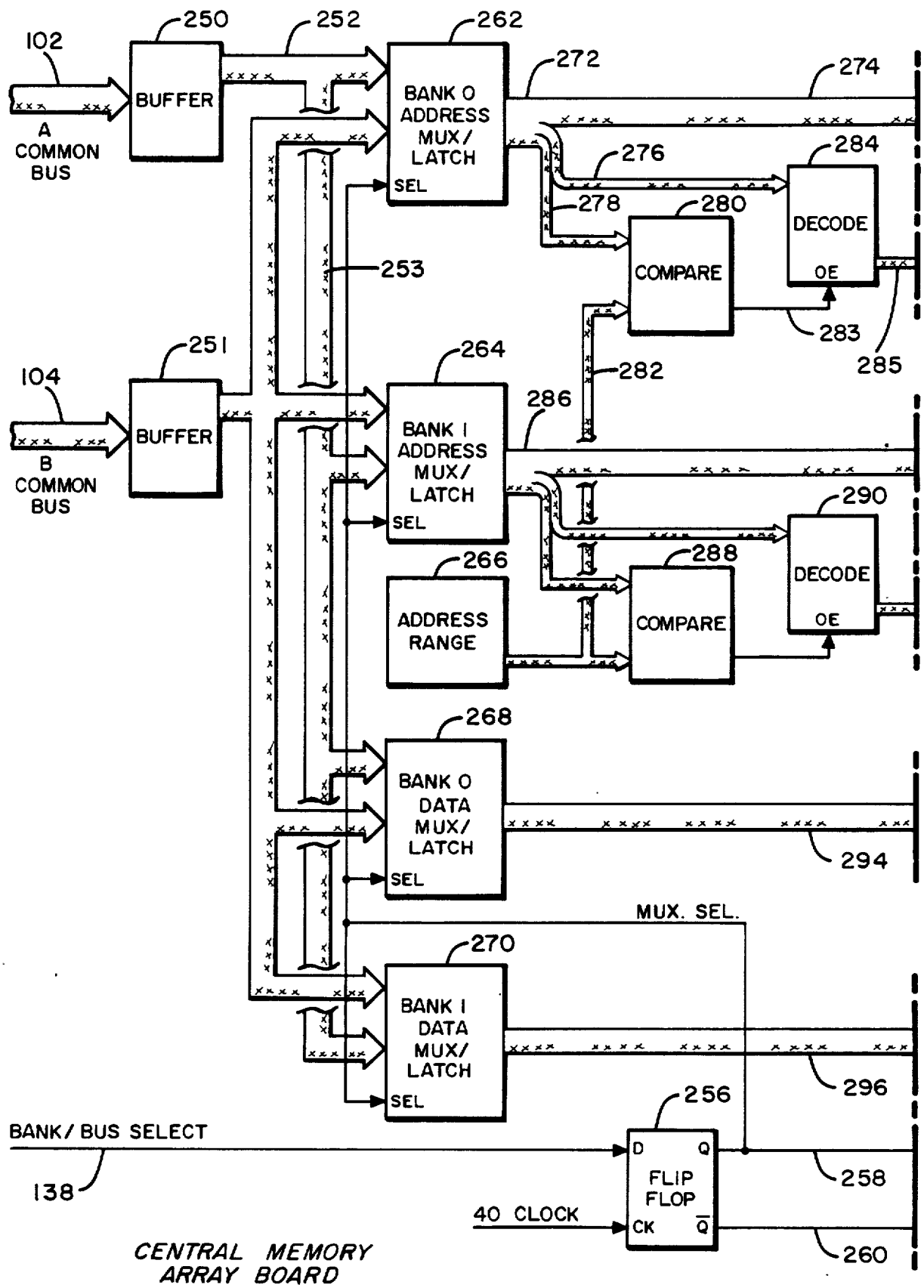

FIGS. 4a and 4b together shows a detailed block diagram of the central memory array board, multiples of which are combined to form the central memory 100 of FIG. 1. Multiplexed address and write data are provided to the array board via the A common bus 102 and the B common bus 104. The A and B common buses are buffered by buffer circuits 250 and 251, respectively, such that the data is presented on internal memory array board buses 252 and 253, respectively. Buffers 250 and 251 function to isolate the internal buses from the external system buses to prevent excessive loading. The Bank/Bus Select signal 138 from Access Control 202 (FIG. 3) is resynchronized by a D-type flip-flop 256 clocked by the "T 40 clock" to generate internal bus select signals on lines 258 and 260 connected to the Q and $\overline{Q}$ outputs thereof. Line 258 provides the multiplexer selection for the multiplexer/latches 262 through 270. When line 138 is low, during the first phase of a memory cycle, the address on A common bus 102 is latched into the Bank 0 address mux/latch 262. During the second half of the memory cycle, the data from A common bus 102 is latched into the Bank 0 data mux/latch 268. Concurrent with these events, the address and data from B common bus 104 is latched into the Bank 1 Address mux/latch 264 and Bank 1 Data mux/latch 270, respectively. If the Bank/Bus select line 138 is high, the A common bus address and data is routed to the Bank 1 address and data latches 264 and 270, respectively, while the B common bus address and data is routed to the Bank 0 latches 262 and 268, respectively.

The output of latch 262 is the 24-bit Bank 0 address field. This is split into three buses, namely, bus 274 which contains bits 2-17 of the address field and forms the 16-bit address for the Bank 0 RAM memory 298; bus 276 which is comprised of bits 18 and 19 which provide inputs to the chip select decoder 284; and, finally, bus 278, which is comprised of bits 20-23 and which provide an input to comparator 280. The other input to comparator 280 is from address range circuitry 266. The address range is a 4-bit code which is uniquely hardwired for each of the 16 possible slots that a memory array board may be connected to. If the address range identified by circuitry 266 is equal to the upper four bits of the address field, the requested address is within the assigned address range of the memory array board. Thus, the output of comparator 280 enables the output of decode circuitry 284, via line 283, to generate one of four possible chip selects on chip select bus 285.

If bit 17 is a 0, a read cycle is indicated. During the second half of the memory cycle, the data from the addressed memory cell of memory 298 is provided on output bus 302 and is latched into either latch 306 or 308, depending on the state of Bank/Bus Select line 138. If the address requested is within the address range of the array board, this data will be presented on either the A read bus 106 or the B read bus 108 during the second half of the memory cycle. If address bit 17 is a "1", the data from latch 268 is written into the address memory cell of memory 298 during the second half of the memory cycle. Similarly, comparator 288 and decode circuitry 290 generates the chip selects 292 for the Bank 1 RAM memory 300. Bus 304 and latches 310 and 312 provide a path for Bank 1 read data to be placed on either the A read bus 106 or the B read bus 108. Write data for the Bank 1 memory is provided from latch 270.

This array board configuration allows concurrent access to Bank 0 and Bank 1 from either the A or B bus each memory cycle restricted only in that both buses cannot simultaneously access the same bank. A given array board may be unselected, selected for one bank only or selected for both banks, depending on the specific combination of addresses concurrently requested.

32-BIT MICROPROCESSOR

Figure 5:
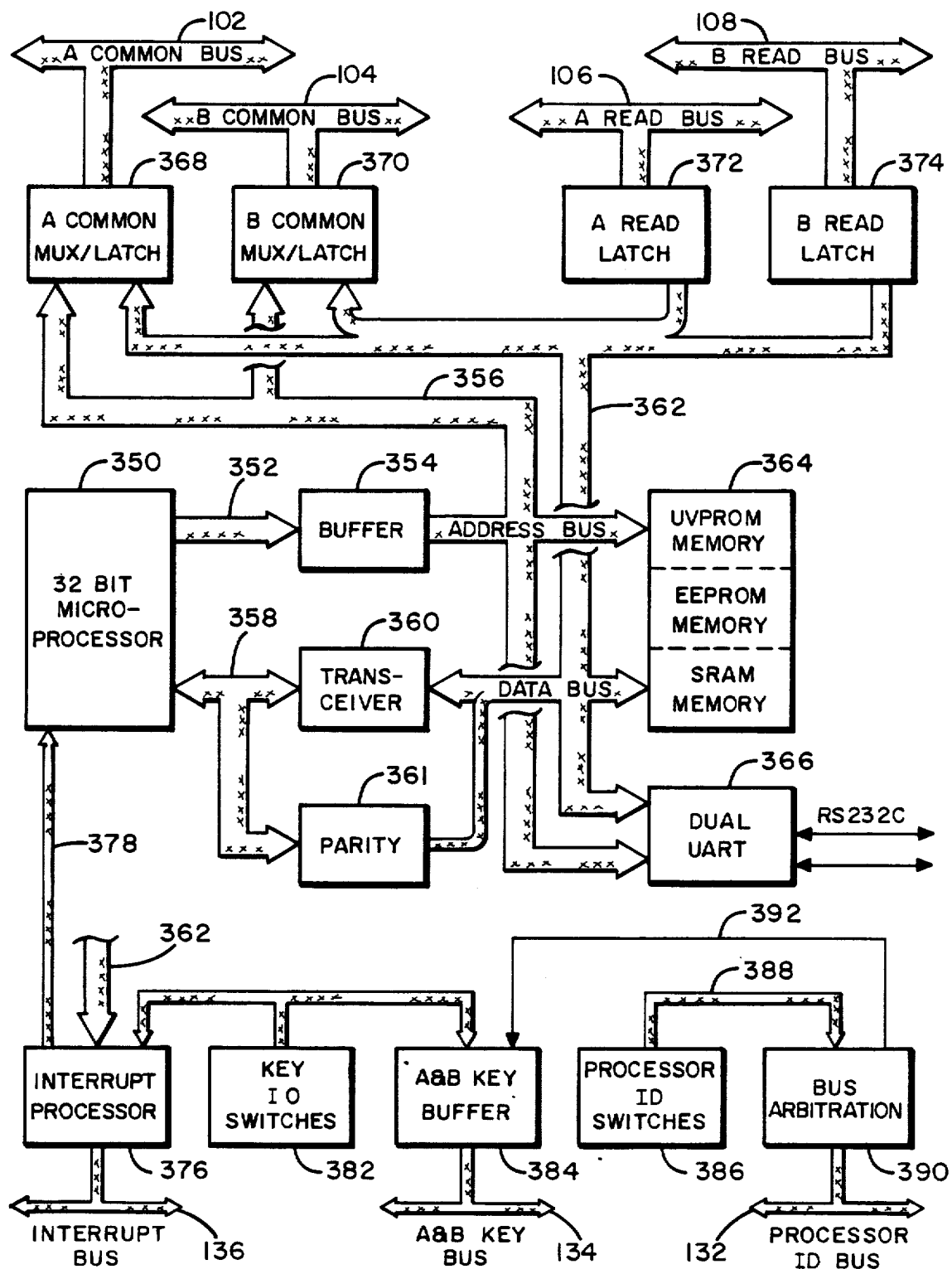
FIG. 5 is a detailed block diagram of the 32-bit nucleus microprocessor.
Figure 6A:
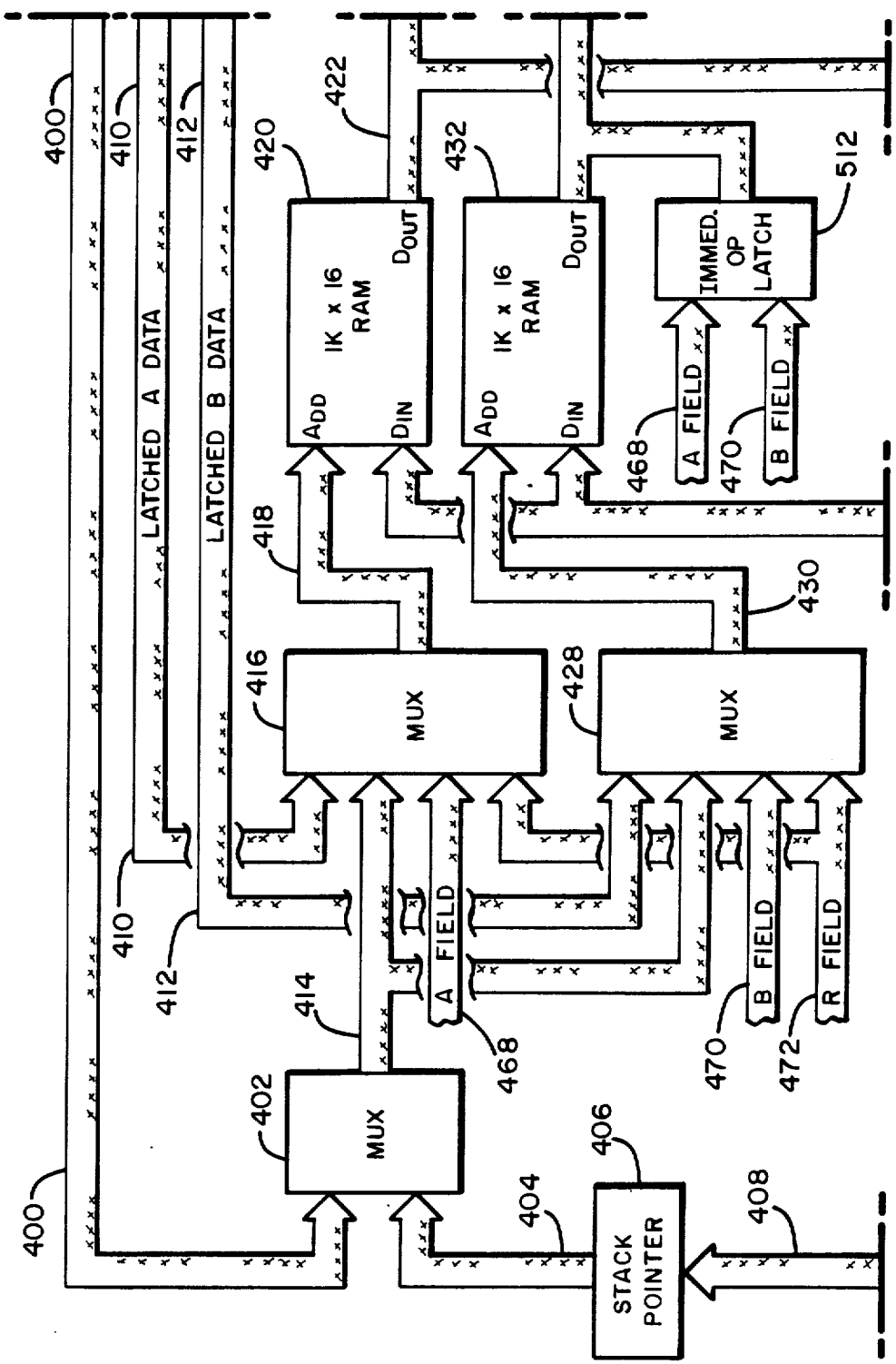
FIGS. 6a through 6d, when arranged as in FIG. 6; is a detailed block diagram of the 16-bit microcontroller used in the communications network adapter of FIG. 1.
Figure 6B:
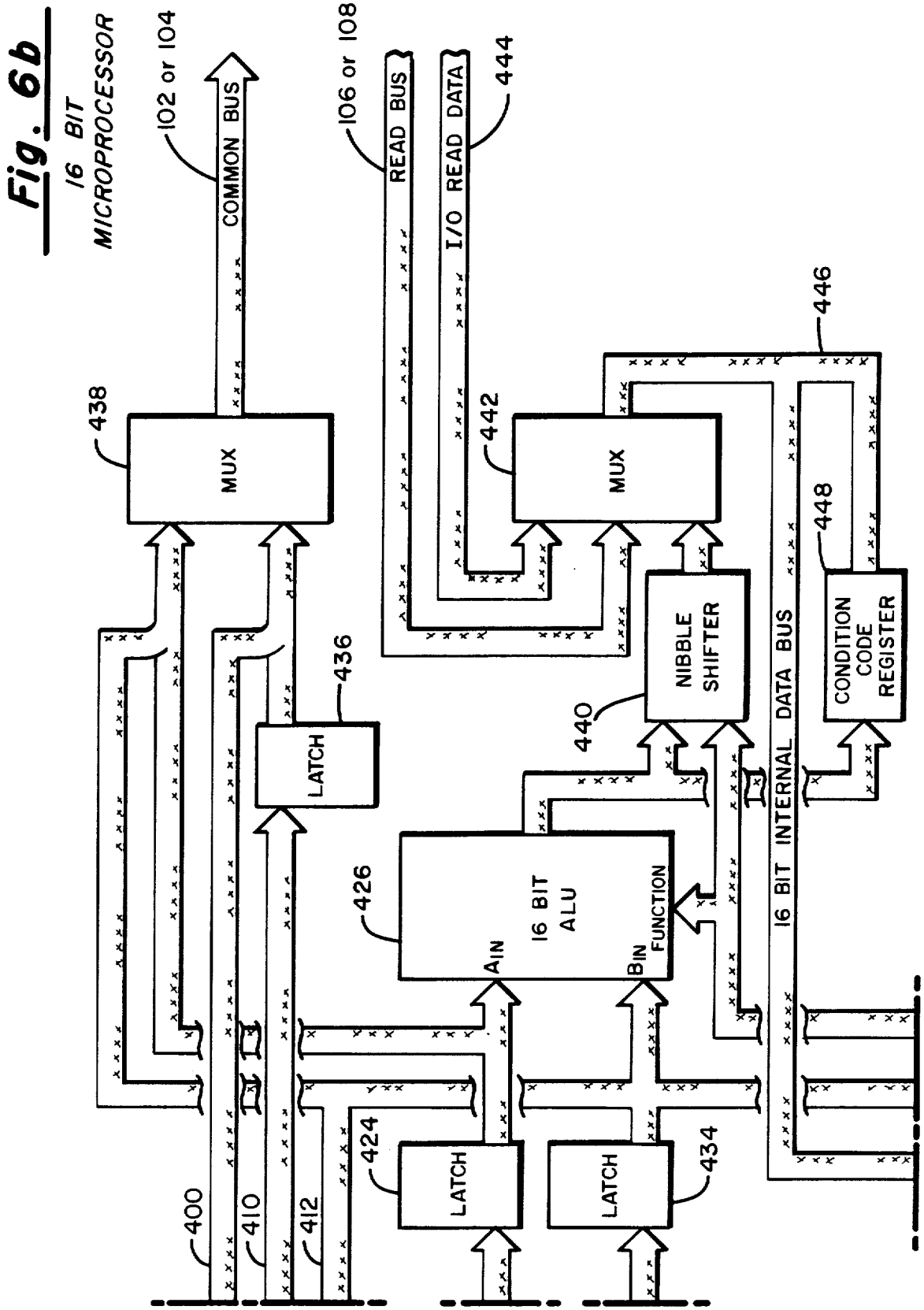
Figure 6C:
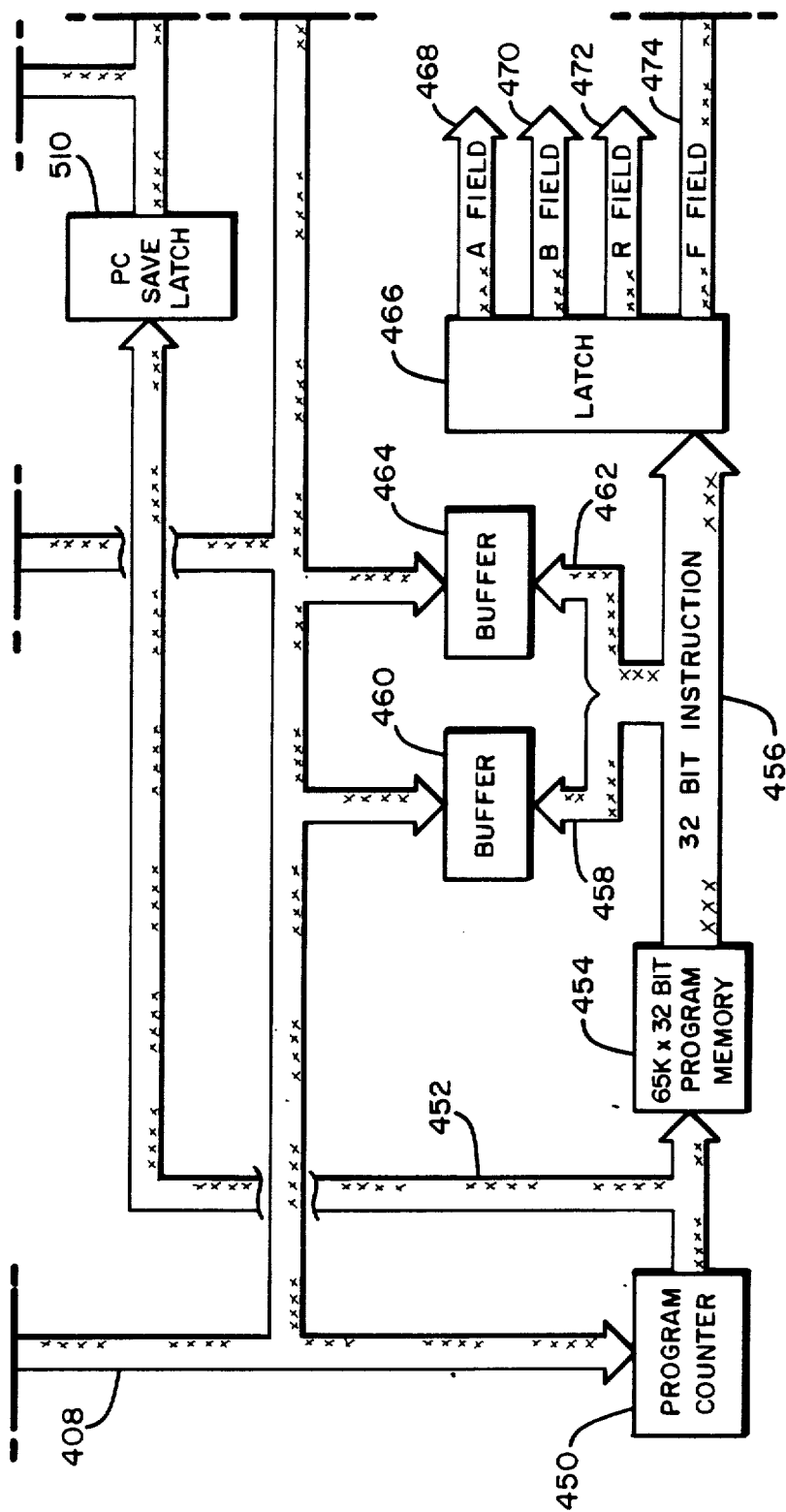
Figure 6D:
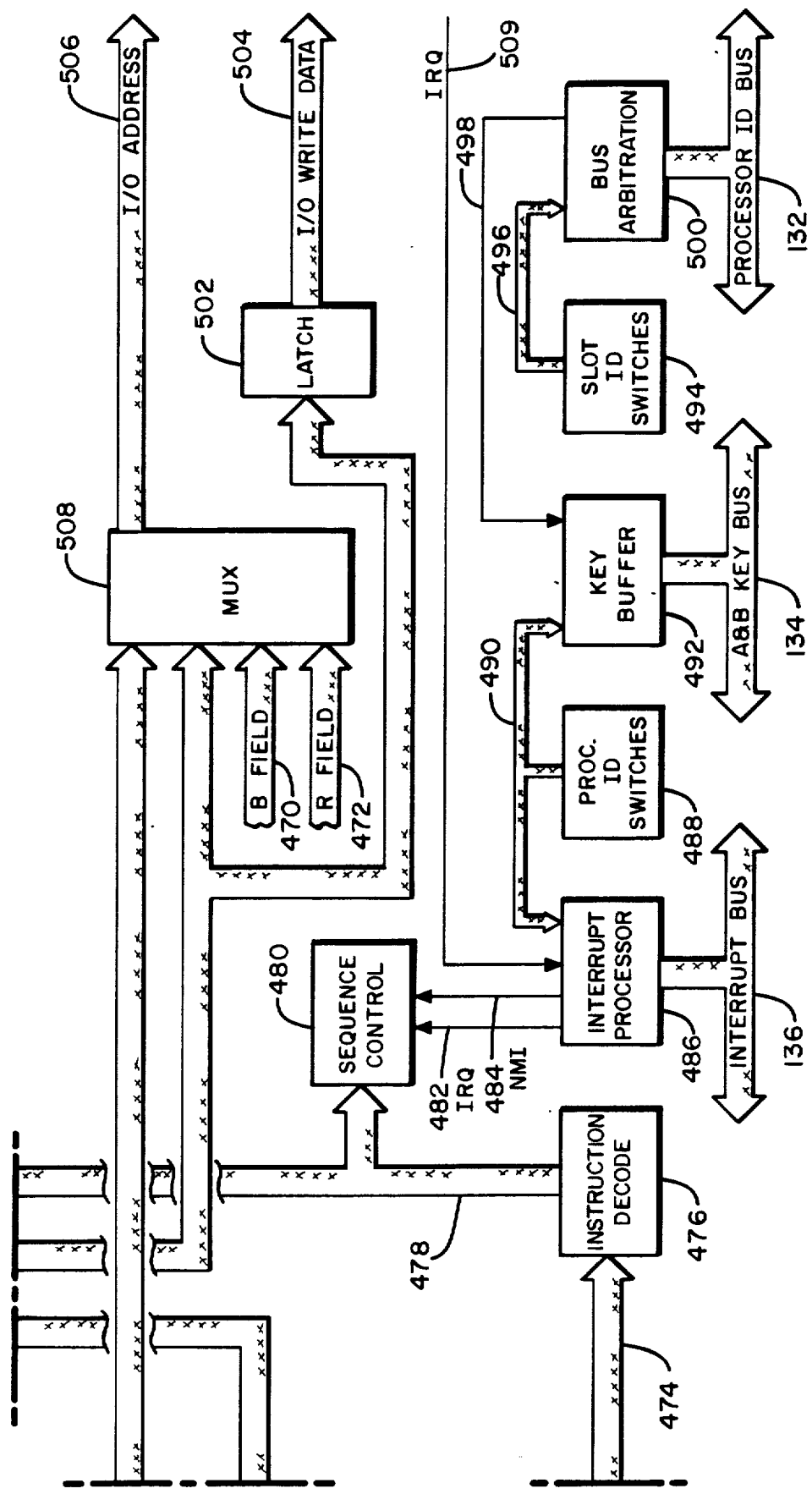

FIG. 5 shows a detailed block diagram of the 32-bit Nucleus Processor. This is built around a single chip 32-bit microprocessor 350, which preferably may be a Type 68020 microprocessor manufactured by Motorola. The principal interfaces to microprocessor 350 are the address bus 352, the bidirectional data bus 358 and the multilevel interrupt bus 378. The 32-bit address bus 352 is buffered by buffer 354 to form the 32-bit internal address bus 356. Data bus 358 is buffered by the bidirectional transceiver circuits 360 to provide a 32-bit internal data bus 362. Data originating from microprocessor 350 has byte parity generated by parity circuit 361 which is appended to data bus 362 to form a 36-bit bus. Data transferred from data bus 362 to the microprocessor 350 has byte parity checked by parity circuit 361. In the event of a parity error, an interrupt is generated, via bus 362, to Interrupt Processor 376.

Address bus 356 and data bus 362 provide internal communication to memory 364 and dual Universal Asynchronous Receiver Transmitter (UART) 366. Memory 364 may be a combination of ultraviolet programmable read-only memory, electrically erasable programmable read-only memory, or static random access memory (RAM). Dual UART circuit 366 provides a dual, bidirectional, serial channel of the RS 232C type. Microprocessor 350 may also communicate with the Central Memory 100 via A and B common buses 102 and 104 and the A and B read buses 106 and 108. Central Memory 100, memory 364, UART 366 as well as other special reserved memory locations are all mapped into the 32-bit memory space of microprocessor 350. Table III below shows an example of memory address allocations which might be made.

TABLE III

| ADDRESS | CONTENTS |
|---|---|
| 00000000 | INTERRUPT VECTOR BASE REGISTER |
| 00000004 | POWER UP PROGRAM COUNT |
| 00000008-000003FF | INTERRUPT VECTOR TABLE |
| 80000400-800FFFFF | PROGRAM MEMORY |
| 80100000-0010FFFF | SHADOW RAM |
| 80200000 | INTERRUPT PRIORITY LEVEL 0 DEVICE FLAGS |
| 80200004 | INTERRUPT PRIORITY LEVEL 1 DEVICE FLAGS |
| 80200008 | INTERRUPT PRIORITY LEVEL 2 DEVICE FLAGS |
| 8020000C | INTERRUPT PRIORITY LEVEL 3 DEVICE FLAG |
| 80200010-0020001F | 68681 DUART |
| 80200020-00200023 | BILLBOARD DISPLAY |
| 80200028-0020002F | 68B40 PROGRAMMABLE TIMER MODULE |
| 80200030-00200033 | SIGNATURE REGISTER |
| 80200040-00200043 | PARITY ERROR ADDRESS |
| 80200050 | SENSE SWITCHES/IRQ BUSY IDLE |
| | BIT 0 = IRQ IDLE if "0" |
| | BIT 0 = IRQ BUSY if "1" |
| | BIT 1 = 68020 CACHE ENABLED if "1" |
| | BITS 2–4 = MSBs of PROCESSOR NUMBER |
| | BITS 5–7 = MSBs of KEY IDENTIFIER |
| 80200060 | INTERRUPT REQUEST REGISTER |
| | BITS 0–3 = DESTINATION |
| | BITS 4–5 = LEVEL |
| 80200070 | CONTROL FUNCTIONS |
| | BIT 0 = CLEAR PARITY ERROR FLAG |
| | BIT 1 = DISABLE INTERRUPTS |
| 0100000-01FFFFFF | CENTRAL MEMORY |

Note that all addresses above 01000000 are accessing Central Memory 100 through the system bus. This requires the coordination of Bus Arbitration circuit 390. Once microprocessor 350 generates an address outside its internal address range, it is placed in a "wait" state, while Bus Arbitration circuit 390 waits for an assigned time slot, i.e., a central memory cycle for which the processor slot I.D. code on bus 132 equals the processor I.D. code from processor I.D. switches 386. During this wait state, the address is frozen on address bus 356 and the data is frozen on data bus 362. When the processor slot I.D. on the bus matches the processor I.D., Bus Arbitration circuit 390 enables the line 392 to cause the processor I.D. code stored in manual switches 382 to be presented to the A and B Key bus 134, via the A and B key buffer 384. Since the 32-bit microprocessor uses both A and B buses concurrently, the processor I.D. code is presented in both the A and B fields.

During the first half of the memory cycle, the lower 24 bits of the 32-bit address field 356 are gated to both the A common bus 102 and the B common bus 104, via multiplexers 368 and 370, respectively. During the second half of the central memory cycle, the upper 16 bits of data bus 362 are gated onto the A common bus 102, via multiplexer 368, while the lower 16 bits of data bus 362 are gated onto the B common bus 104 via multiplexer 370. Upon completion of the external memory write cycle, microprocessor 350 is released from the wait state.

For a central memory read cycle, the same procedure is followed with the exception that the source of data is now from Central Memory 100 and, during the second half of the read cycle, is gated from the A and B read bus. The upper 16 bits of data are captured in A read latch 372 while the lower 16 bits of read data are captured in the B read latch 374.

As will be pointed out in greater detail when the Interrupt Control of FIG. 11 is described, Interrupt Processor 376 processes both internally and externally generated interrupts.

16-BIT MICROCONTROLLER

FIGS. 6a through 6d, when arranged as in FIG. 6 shows the preferred embodiment of the 16-bit microcontrollers 114 through 118 shown in the network adapter block diagram (FIG. 1). In this embodiment, FIGS 6a through 6b comprises a 16-bit microprocessor with a dedicated interface to the central memory buses 102 and 106 or, alternatively, 104 and 108 along with the interface to A and B key buses, key bus 134 and processor I.D. bus 132 to permit access to Central Memory 100. The aforementioned interfaces are duplicated for the direct memory access I/O control of FIGS. 7a and 7b such that both the microprocessor and the DMA can access Central Memory with different processor I.D. numbers.

For clarity, FIG. 1 shows both the microprocessor and the DMA sharing the same A or B bus, but this is in fact not a restriction. This is a desirable configuration in that it enables sustained 50 megabit or 100 megabit, DMA transfer between a host device and the Central Memory all under the control of the 16-bit microprocessor.

Consider first the microprocessor FIGS. 6a through 6d. It is preferably a special purpose high-speed microprocessor built upon a 16-bit arithmetic logic unit 426, such as a configuration of four 74F181 four-bit ALUs manufactured by Fairchild and others. It employs a 32-bit instruction format to provide a rich repertoire of instructions particularly well-suited for packet message handling. The two instruction formats are shown in Table IV below.

The following Instruction Register formats are decoded to control the microprocessor hardware functions.

TABLE IV

| MSB | | | | LSB |
|---|---|---|---|---|
| 31 24 | 23 16 | 15 8 | 7 0 | |
| FUNCTION CODE | DESTINATION | SOURCE A | SOURCE B | |

Format 1 - is a register to register type operation.

TABLE IV-continued

| MSB | | LSB |
|---|---|---|
| 31 24 | 23 16 | 15 0 |
| FUNCTION CODE | SOURCE D DESTINATION | IMMEDIATE OPERAND |

Format 2 - is an immediate operand type operation.

Format I is used for register-to-register type of operations. In this format, the upper byte, hereafter referred to as the "function code" or F field, defines the arithmetic or logical function to be performed by the ALU. The secondmost significant byte is the destination field, hereafter referred to as the R field, which defines the destination of the results of the ALU operation. The nextmost significant byte defines the source of the data for the A input to the ALU. This field may be either a direct or an indirect address. Similarly, the least significant byte defines the source of the data for the B input of the ALU. These fields will hereafter be referred to as the A and B fields.

Format II is an alternative format which is used only for immediate operand-type of operations. In this case, the two least significant bytes, the A and B fields, are combined to provide an immediate 16-bit operand which becomes the B input to the ALU. The specific operation performed during a given instruction cycle is determined by the F field.

The function code field is divided into two parts. Bit 28 through bit 31 generally define the ALU operation to be performed. Bit 24 through 27 provide additional instruction decode and addressing mode direction to derive register to register format instructions.

The function code field, is an 8 bit field, located in bits 24 through 31 of the Instruction Register. This field defines the hardware operation to be performed. The function code field is divided into two parts; bits 28 through 31 generally define the ALU operation to be performed. Bit 24 through bit 27 provide additional instruction decode and addressing mode direction to derive register to register format instructions.

Function codes OX through FX are decoded as follows:

Function code=OX. This function decodes to an ALU addition without carry operation. The results of this operation will effect bits 0 through 3 of the Condition Register.

Function code=IX. This function decodes to an ALU subtract without carry operation. The results of this operation will effect bits 0 through 3 of the Condition Register.

Function code=2X. This function decodes to an ALU Add with carry operation. The results of this operation will effect bits 0 through 3 of the Condition Register.

Function code=3X. This function decodes to an ALU subtract with carry operation. The results of this operation will effect bits 0 through 3 of the Condition Register.

Function code=4X. This function decodes to an ALU Inclusive OR operation. The results of this operation will effect bits 2 and 3 of the Condition Register.

Function code=5X. This function decodes to an ALU Exclusive OR operation. The results of this operation will effect bits 2 and 3 of the Condition Register.

Function code=6X. This function decodes to an ALU Logical AND operation. The results of this operation will effect bits 2 and 3 of the Condition Register.

The data sources for the ALU operations are from source A and source B, if format 1 or from source D and the immediate value in the IR, if format 2. The resultant data is sent to the destination, if specified. The function modifier X, bits 24 through 27, for the 0X to 6X functions are as follows:

Bit 27 = 1 indicates format 1.
    Bit 26 = 0 indicates direct addressing for the destination.
    Bit 26 = 1 indicates indirect addressing for the destination.
        Bit 25 = 0 indicates direct addressing for the source A.
        Bit 25 = 1 indicates indirect addressing for the source A.
        Bit 24 = 0 indicates direct addressing for the source B.
        Bit 24 = 1 indicates indirect addressing for the source B.
Bit 27-0.
    Bit 26 = 0 indicates NO destination specified, results are dumped.
        Bit 25 = 0 indicates direct addressing for the source A.
        Bit 25 = 1 indicates indirect addressing for the source A.
        Bit 24 = 0 indicates direct addressing for the source B.
        Bit 24 = 1 indicates indirect addressing for the source B.
    Bit 26 = 1 indicates format 2.
        Bit 25 = 0 indicates the results are sent to the destination.
        Bit 25 = 1 indicates NO destination specified.
        Bit 24 = 0 indicates direct addressing for the source D and, if specified, the destination.
        Bit 24 = 1 indicates indirect addressing for the source D and, if specified, the destination.

Function code=7X. This function decodes to an ALU Increment or Decrement operation. The data is from source A, and the incremented or decremented data is sent to the destination. The results of this operation will effect bits 0 through 3 of the Condition Register. The function modifier X, bits 24 through 27, for the 7X function are as follows:

Bit 27 = 1 indicates an Increment ALU operation. Bit 27 = 0 indicates a Decrement ALU operation.
    Bit 26 = 0 indicates a destination is specified.
        Bit 25 = 0 indicates direct addressing for the destination.
        Bit 25 = 1 indicates indirect addressing for the destination.
        Bit 24 = 0 indicates direct addressing for the source A.
        Bit 24 = 1 indicates indirect addressing for the source A.
    Bit 26 = 1 indicates NO destination is specified.
        Bit 25 = 0/1 not decoded.
        Bit 24 = 0 indicates direct addressing for the source A.
        Bit 24 = 1 indicates indirect addressing for the source A.

Function code=8X. This function decodes to a shift operation. The data to be shifted is from source A. The shifted data is sent to the destination. The results of the single bit left shift operation will effect bits 0 through 3 of the Condition Register. The results of the four bit shift have no effect on the Condition Register The function modifier X, bits 24 thru 27, for the 8X function is as follows:

Bit 27 = 1 indicates a single bit shift.
    Bit 26 = 0 indicates a destination is specified.
        Bit 25 = 0 indicates direct addressing for the destination.
        Bit 25 = 1 indicates indirect addressing for the destination.
        Bit 24 = 0 indicates direct addressing for the source A.
        Bit 24 = 1 indicates indirect addressing for the source A.
    Bit 26 = 1 indicates NO destination is specified.
        Bit 25 = 0/1 not decoded.
        Bit 24 = 0 indicates direct addressing for the source A.
        Bit 24 = 1 indicates indirect addressing for the source A.
Bit 27 = 0 indicates a four bit shift.
    Bit 26 = 0 indicates a left shift.
        Bit 25 = 0 indicates direct addressing for the destination.
        Bit 25 = 1 indicates indirect addressing for the destination.
        Bit 24 = 0 indicates direct addressing for the source A.
        Bit 24 = 1 indicates indirect addressing for the source A.
    Bit 26 = 1 indicates a right shift.
        Bit 25 = 0 indicates direct addressing for the destination.
        Bit 25 = 1 indicates indirect addressing for the destination.
        Bit 24 = 0 indicates direct addressing for the source A.
        Bit 24 = 1 indicates indirect addressing for the source A.

Function code=9X. This function decodes to a Move or More Complement operation. The data is moved from source A on format 1 or is the immediate value on format 2, the data is moved to the destination. The result of this operation has no effect on the Condition Register. The function modifier X, bits 24 through 27, are defined as follows:

Bit 27 = 1 indicates the data is not complemented. Bit 27 = 0 indicates the data is complemented.
    Bit 26 = 0 indicates a format 1.
        Bit 25 = 0 indicates direct addressing for the destination.
        Bit 25 = 1 indicates indirect addressing for the destination.
        Bit 24 = indicates direct addressing for the source B.
        Bit 24 = 1 indicates indirect addressing for the source B.
    Bit 26 = 1 indicates a format 2.
        Bit 25 = 0 indicates direct addressing for the destination.
        Bit 25 = 1 indicates indirect addressing for the destination.
        Bit 24 = 0/1 not decoded.

Function code=AX. This function decodes to control the Program Counter. The results of this operation have no effect on the Condition Register. The function modifier X, bits 24 through 27, is encoded and will be defined as a four bit binary value.

Bits 27-24 =
    0000 = Jump - load the PC from IR source B direct.
    0001 = Jump - load the PC from IR source B indirect.
    0010 = Jump - load the PC with IR immediate value.
    0011 = RTN/IRQ - load the PC with IR immediate value.
    0100 = JSR - load the PC from IR source B direct.
    0101 = JSR - load the PC from IR source B indirect.
    0110 = JSR - load the PC with IR immediate value.
    0111 = RTN/JSR - load the PC with IR immediate value.
    1000 = Jump - add IR source B direct to the PC.
    1001 = Jump - add IR source B indirect to the PC.
    1010 = Jump - add IR immediate value to the PC.
    1011 = RTN/IRQ - add IR immediate value to PC from stack.
    1100 = JSR - add IR source B direct to the PC.
    1101 = JSR - add IR source B indirect to the PC.
    1110 = JSR - add IR immediate value to the PC.
    1111 = RTN/JSR - add IR immediate value to PC from stack.

Note: All JSR's push the PC to stack, all RTN/JSR's pop the PC from the stack but may reload the PC. All IRQ's push the PC and CC to the stack. All RTN/IRQ's pop the PC and CC from the stack but may reload the PC.

Function code=BX. This invention decodes to a Read or Write of the I/O bus. The address for the I/O bus is from source B on a read, and from source D on a write. The data from a read is sent to destination, and the data on a write is from source B or the immediate value in the IR. The results of this operation have no effect on the Condition Register. The function modifier X, bits 24 through 27, for the BX function is as follows:

```
Bit 27 = 1 indicates a Read I/O.
    Bit 26 = 0/1 not decoded.
        Bit 25 = 0 indicates direct addressing for the
            destination.
        Bit 25 = 1 indicates indirect addressing for the
            destination.
        Bit 24 = 0 indicates direct addressing for the source B.
        Bit 24 = 1 indicates indirect addressing for the source B.
Bit 27 = 0 indicates a Write I/O.
    Bit 26 = 0 indicates a format 1.
        Bit 25 = 0 indicates direct addressing for the destination.
        Bit 25 = 1 indicates indirect addressing for the
            destination.
        Bit 24 = 0 indicates direct addressing for the source B.
        Bit 24 = 1 indicates indirect addressing for the source B.
    Bit 26 = 1 indicated a format 2.
        Bit 25 = 0 indicates direct addressing for the
            destination.
        Bit 25 = 1 indicates indirect addressing for the
            destination.
        Bit 24 = O/I not decoded.
```

Function code=CX. This function decodes to a read or write on the main memory bus. The lower memory address is from source A, the upper memory address is from source B. The data on a write is from source D, data on a read is sent to the destination. The results of this operation have no effect on the Condition Register. The function modifier X, bits 24 through 27, for the CX functions is as follows:

```
Bit 27 = 1 indicates a Read Memory, format 1.
    Bit 26 = 0 indicates direct addressing for the destination.
    Bit 26 = 1 indicates indirect addressing for the
        destination.
    Bit 25 = 0 indicates direct addressing for the source A.
    Bit 25 = 1 indicates indirect addressing for the source A.
    Bit 24 = 0 indicates direct addressing for the source B.
    Bit 24 = 1 indicates indirect addressing for the source B.
Bit 27 = 0 indicates a Write memory, format 1.
    Bit 26 = 0 indicates direct addressing for the destination.
    Bit 26 = 1 indicates indirect addressing for the
        destination.
    Bit 25 = 0 indicates direct addressing for the source A.
    Bit 25 = 1 indicates indirect addressing for the source A.
    Bit 24 = 0 indicates direct addressing for the source B.
    Bit 24 = 1 indicates indirect addressing for the source B.
```

Function code=DX. This function decodes to perform a Stack or condition Register read or write. The data for a write is from source B or the intermediate value in the IR, the data on a read is sent to the destination. The results of this operation have no effect on the Condition Register. The function modifier X, bits 24 through 27, for the DX function is as follows:

```
Bit 27 = 0 indicates operation is a write.
    Bit 26 = 0 indicates a stack operation.
        Bit 25 = 0 indicates format 1.
            Bit 24 = 0 indicates direct addressing for source B.
            Bit 24 = 1 indicates indirect addressing for source B.
        Bit 25 = 1 indicates format 2.
            Bit 24 = 0/1 not decoded.
    Bit 26 = 1 indicates a Condition Code Register operation.
        Bit 25 = 0 indicates format 1.
            Bit 24 = 0 indicates direct addressing for source B.
            Bit 24 = 1 indicates indirect addressing for source B.
        Bit 25 = 1 indicates format 2.
            Bit 24 = 0/1 not decoded.
Bit 26 = 1 indicates a Condition Code Register operation.
    Bit 25 = 0 indicates format 1.
        Bit 24 = 0 indicates direct addressing for source B.
        Bit 24 = 1 indicates indirect addressing for source B.
    Bit 25 = 1 indicates format 2.
        Bit 24 = 0/1 not decoded.
Bit 27 = 1 indicates operation is a read.
    Bit 26 - 0 indicates a stack operation.
        Bit 25 = 0/1 not decoded.
            Bit 24 = 0 indicates direct addressing for destination.
            Bit 24 = 1 indicates indirect addressing for
                destination.
    Bit 26 = 1 indicates a Condition Code Register operation.
        Bit 25 = 0/1 not decoded.
            Bit 24 = 0 indicates direct addressing for
                destination.
            Bit 24 = 1 indicates indirect addressing for
                destination.
```

Function code=EX. This function code is NOT used.

Function code is FX. This function decodes to perform a Program Memory read or write operation. The PM address comes from source A, data for a write from source D, and data on a read is sent to the destination. The results of this operation have no effect on the Condition Register. The function modifier X, bits 24 through 27, for the FX function is as follows:

```
Bit 27 = 0 indicates a write operation
    Bit 26 = 0 indicates a write of the lower 16 bits.
    Bit 26 = 1 indicates a write of the upper 16 bits.
    Bit 25 = 0/1 not decoded.
    Bit 24 = 0 indicates a write to the Program Memory.
    Bit 24 = 1 indicates a write to the Maintenance
        Interface.
Bit 27 = 1 indicates a read operation.
    Bit 26 = 0 indicates a read of the lower 16 bits.
    Bit 26 = 1 indicates a read of the upper 16 bits.
    Bit 25 = 0/1 not decoded.
    Bit 24 = 0 indicates a read of the Program Memory.
    Bit 24 = 1 indicates a read of the Maintenance
        Interface.
```

Microprocessor timing is derived from the 50 MHz master clock in the manner described in FIG. 2A to assure synchronous operation with the rest of the Node Adapter. The processor's basic cycle duration is 160 nanoseconds. Instruction execution times comprise from one to four 160-nanosecond cycles. The cycle control for instruction execution is managed by a 2-bit cycle counter contained in Sequence Control 480. Processor instructions are pre-fetched at the end of previous instruction executions and decoded by instruction decode or translator 476 to determine the number of cycles required. The cycle counter is loaded at the start of an instruction cycle with a count of the number of cycles required to execute the decoded instruction. The outputs of the cycle counter are decoded to produce from one to four cycles, each of 160 nanoseconds duration, as required to execute the pre-fetched instruction.

To execute a program instruction, Program Counter 450 provides a 16-bit address to the 65K-by-32-bit Program Memory 454. This is preferably a UVPROM or EEPROM and, if a EEPROM, it can be subsequently altered during the course of operation via a design support interface. The output data of memory 454 then is the 32-bit instruction word 456 to be currently executed. This is captured in latch 466 and is parsed into the A, B, R and F fields 468 through 474 as previously described. The F field is decoded in the aforementioned manner by instruction decode 476, which identifies the function to be performed by ALU 426, and the control sequence to be generated by Sequence Control 480 over data path 478. Sequence Control 480 controls the movement of all data in the microprocessor. Specifically, it controls the selection of multiplexors 402, 416, 428, 438, 442 and 508. It further controls the output enables (OE) on RAM memories 420 and 432, latches 512 and 510, transceivers 460 and 464, mux 442 and condition code register 448. It further controls the clock signals to latches 424, 434, 510, 436 and 502, the read/write mode of memories 420, 432 and 454, and the preset of Program Counter 450. The A input data for ALU 426 is provided by data path 422, via latch 424. The normal source of this data is the output of 1K-by-16 bit RAM 420. RAM memories 420 and 432 together comprise a 1K word register file similar to the 16 word dual port register file memories used in conventional high-speed microprocessors. Multiplexor 416 provides four sources of address for RAM 420. These are the latched A data 410, the output of multiplexor 414, which may either be the stack pointer output 404 or the previously latched A data captured in latch 436. Latch 436 provides the means to perform indirect addressing, i.e., the A address field points to an address in the register file, the content of which is the address for the source of the A data. Yet another source for multiplexor 416 is the A field 468 of the instruction word. Yet a fourth source of address is the R field 472 of the same instruction word.

The normal source of the input data for ALU 426 is the output of RAM memory 432, via latch 434. There are also four sources of address for this memory, via multiplexor 428. These are the latched B data 412, the output of multiplexor 402, the B field 470 or the R field 472. Any instructions cause a 16-bit word to be generated on the internal data bus 446. The source of this data may be the multiplexor 442. It is used in ALU operations where the output of ALU 426 passes through nibble shifter 440 and multiplexor 442. Nibble shifter 440 either rotates the 16-bit word plus four, minus four or zero bits as it passes through. Mux 442 also provides means to read data from central memory, via the read bus, which may be connected to either bus 106 or 108 as well as a means to read information from the DMA section, via I/O read bus 442.

The execution of various instructions will cause certain bits of the condition code register 448 to be set. For instructions which sense the condition code, register 448 alternatively becomes a source of data for bus 446. Transceivers 460 and 464 provide yet another source of data for bus 446, i.e., the upper or lower 16 bits of instruction bus 456, respectively.

The data generated on bus 446 may be routed to various destinations, e.g., RAM memories 420, 432, program memory 454, stack pointer 406, or program counter 450. Stack pointer 406 is a presettable up/down counter which enables conventional stack operations associated with interrupt handling and subroutine calls. The stack is contained in the lower 256 word page of RAM memories 420 and 432. In operating the stack or the register file, identical data is written into identical addresses in both memories. Two memories thus behave in the same manner as a single 1K word, dual port RAM memory would.

For instruction which require a push of the program count onto the stack. The program count is captured in latch 510. It subsequently passes through the ALU 426, nibble shifter 440, mux 442, data bus 446 and is written to the stack at the address provided by stack pointer 406. On a return from interrupt or return from subroutine, the stack pointer points to the address of RAM 420 or 432 which provides the previously saved program count which is restored to program counter 450, via bus 446.

For immediate type operations, the A field 468 and B field 470 are captured in the immediate operand latch 512 which provides the immediate operand input at the B input of ALU 426.

Data movement between the Central Memory and the microprocessor is via the register file. Separate addresses in the register file are used for the upper and lower field of the memory address and a third cell is used for the data. To write to Central Memory, the first instruction cycle moves the write data from RAM 420 to latch 436. A second instruction cycle reads the upper address field from RAM 432 and the lower address field from RAM 420. The 24-bit address is thus captured in latches 424 and 434 and held until bus Arbitration Circuit 500 determines that the processor slot I.D. on bus 32 corresponds to the processor I.D. set-in switches 494. Then, in the manner previously described, the address and data is multiplexed onto common bus 102 or 104. To move data from Central Memory 100 to the register file, the address is formed as before in latches 424 and 434 but this time the read data from read bus 106 or 108 is written into the register file, via multiplexor 442 and data bus 446.

Control of the direct memory access (DMA) section is by means of a memory mapped I/O system. I/O address bus 506 provides an 8-bit address field to define 256 I/O addresses or registers, each register being 16 bits wide. To write to an I/O register, the first instruction cycle moves the write data from RAM 432 to latch 502. Then, a second instruction cycle generates the I/O address on bus 506. There are four sources for this address—the output of RAM 420, the output of latch 434, the B field 470 or the R field 472.

To execute an I/O read, an I/O read instruction is executed during two cycles to generate an I/O address on bus 506. However, in this instance, the read data from I/O read bus 444 is transferred into the register file, via mux 442 and data bus 446.

Interrupt Processor 486 is identical to the previously described Interrupt Processor 376, except that the masking and vectoring of interrupts are controlled, via the memory mapped I/O. A write to I/O register 503 (FIGS. 7a and 7b) sets the interrupt mask and a read of I/O register 501 reads the interrupt vector. A four bit value indicates the highest of twelve possible interrupt levels which may be currently active. Once the level of interrupt, which is indicated by a register to be described when the details of the Interrupt Processor are explained, is cleared, the next read of this register will provide the next highest active interrupt level. Table V below sets out the twelve interrupt levels. To avoid confusion in the drawing of FIG. 6, the control lines emanating from sequence control logic 480 are purposely omitted.

Sequence control 480 (FIG. 6d) is responsive to the Interrupt Request (IRQ) signal on line 482 or the Non-Maskable Interrupt (NMI) signal on line 484 from Interrupt Processor 486.

Special instruction groups are provided for writing information into or reading information from the central memory or from the I/O bus. Specifically, when the function code field is decoded and interpreted as a "read" or a "write" of the I/O bus, the address for the I/O bus is from source B on a read, and from source D on a write. The data from a "read" is sent to the destination, and the data on a "write" is from source B specified by the instruction or can be the immediate value in the instruction register. Depending upon the bit permutations of the function code, either direct or indirect addressing for the source and destination can be achieved. Likewise, a function CX (hex) is interpreted as a read or a write on the main memory bus. The lower memory address is from source A, the upper memory address is from source B. The data on a write is from source D while data on a read is sent to the indicated destination. Again, depending on the bit permutations of the CX instruction, a read or a write of Central Memory using direct addressing or indirect addressing can be effected.

It should also be noted that the execution of instructions having the BX and CX function codes are defined by single instructions but both the address and the location of the data are manipulated in two separate cycles or phases of execution of those single instructions.

TABLE V

| Level | Meaning |
| --- | --- |
| 12 | Nucleus Level 3 Interrupt (Pending Reset) |
| 11 | Memory Fault - Processor |
| 10 | Memory Fault - Direct Memory Access |
| 9 | Device High Priority Interrupt |
| 8 | Write Controller Service Request |
| 7 | Read Controller Service Request |
| 6 | Nucleus Level 2 Interrupt (Queue Element) |
| 5 | Nucleus Level 1 Interrupt |
| 4 | Device Low Priority Interrupt |
| 3 | On Board Timer Expired |
| 2 | Nucleus Level 0 Interrupt |
| 1 | Design Support Pod Request |
| 0 | Idle |

Bit 4 through 15—NOT USED

The condition code register 448, is sixteen bits wide, and contains the condition bits set as a result of arithmetic, logical, shift or interrupt operations. The bits are as defined in Table VI:

TABLE VI

| Bit 15-8 | undefined |
| --- | --- |
| Bit 7 | NMI sequence |
| Bit 6-5 | undefined |
| Bit 4 | Interrupt enabled |
| Bit 3 | Operation result is equal to zero. |
| Bit 2 | Operation result is negative. |
| Bit 1 | ALU operation generated a carry. |
| Bit 0 | ALU operation generated an overflow. |

DIRECT MEMORY ACCESS CIRCUITRY

Figure 7A:
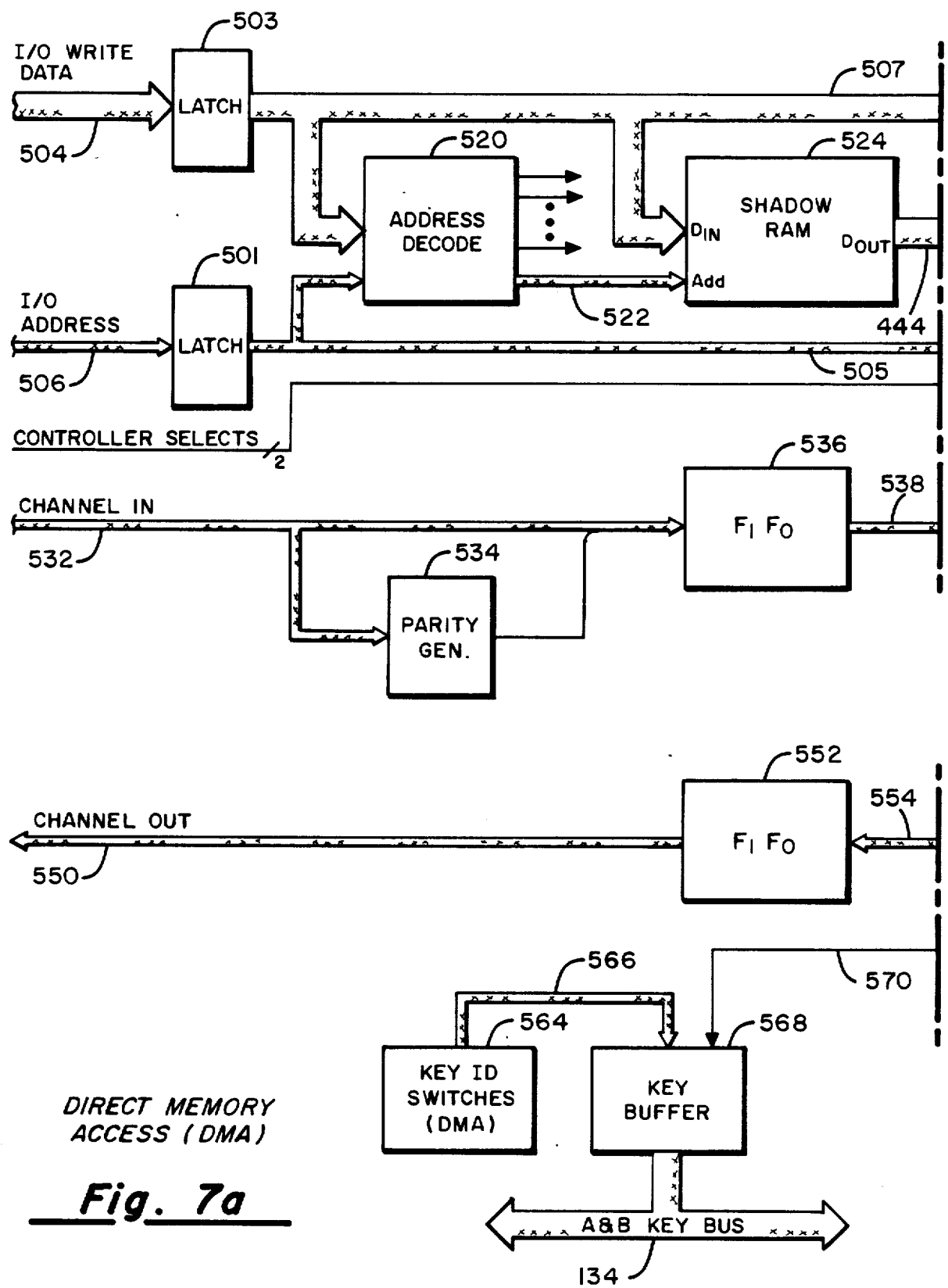
FIGS. 7a and 7b, when arranged as in FIG. 7 is a block diagram representation of the DMA circuitry.
Figure 7B:
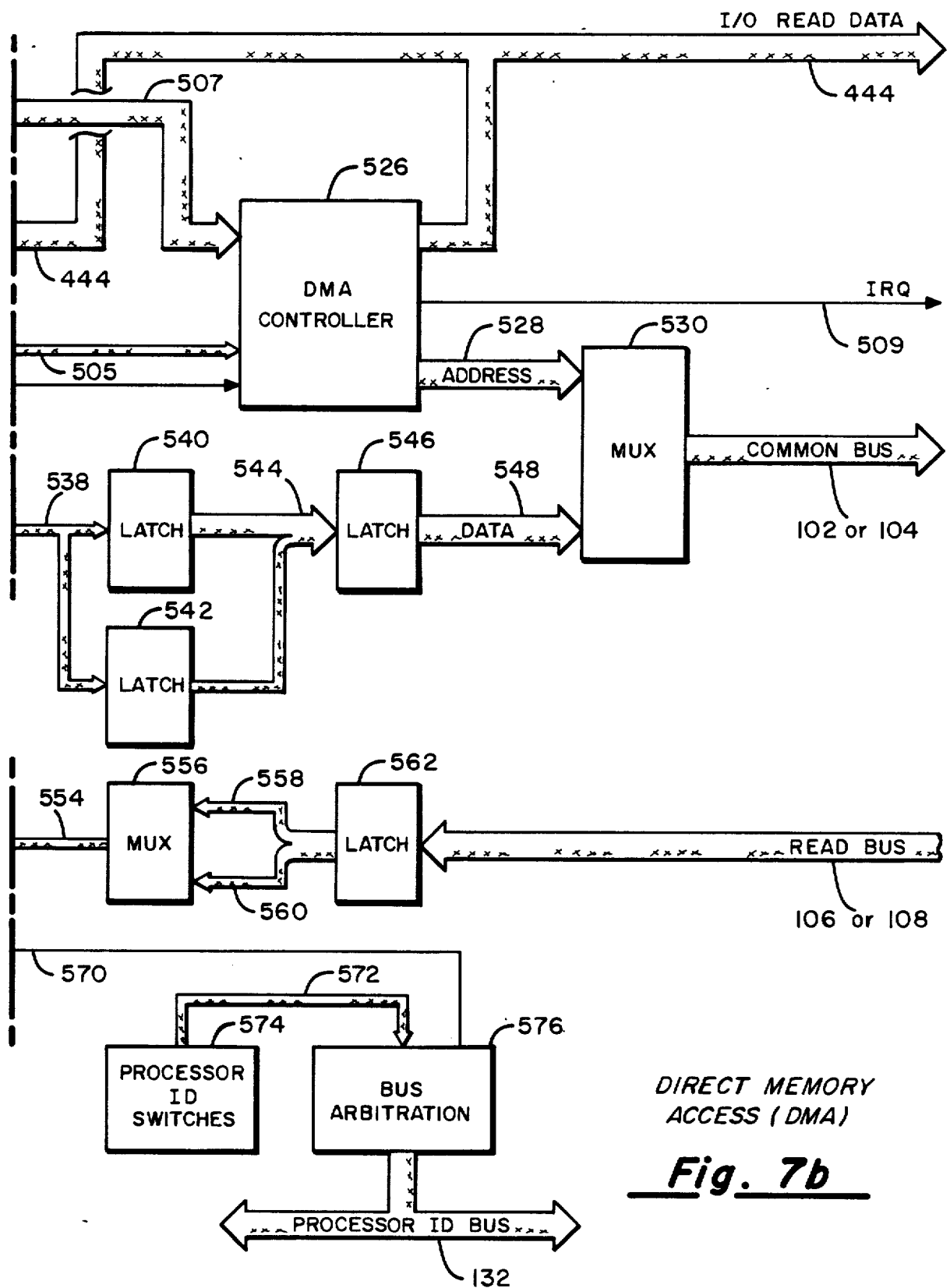

FIGS. 7a and 7b together show a block diagram of the direct memory access circuitry. This DMA circuitry functions to provide automatic movement of data from an attached device to and from Central Memory where the attached devices may be a communications trunk, a main frame computer or a cluster of low performance digital devices. The circuitry is comprised of four "read from memory" (read channel) and four "write to memory" (write channel) DMA controllers. The read and write channels are full duplex, i.e., allow concurrent operation. A read channel operation and a write channel operation may each be running a 50-megabit transfer simultaneously or, alternatively, a single read channel operation or a single write channel operation may be run at a 100-megabit rate. Each controller is split into two descriptors, i.e, Descriptor 0 and Descriptor 1, which are linked such that if the active descriptor depletes, it will become inactive and the alternate descriptor will become active. This provides a form of double-buffering for the DMA controller such that the controlling processor can update the inactive descriptor while maintaining uninterrupted DMA transfer. For either read or write channel operation, the device interface provides the desired controller selects. Therefore, to run multiple controllers, all controllers must be preloaded by the controlling microprocessor and ready for operation.

For single controller operations where the device interface does not provide controller select information, the default is to controller no. 3. Any number of controllers may be used and selected, provided the controlling firmware is structured to conform to the device configuration.

Control of the DMA circuitry is provided by the 16-bit microprocessor of FIGS. 6a through 6d, via I/O address lines 506 and I/O write data bus 504 which provide inputs to latches 501 and 503. The I/O address bus defines 256 memory mapped I/O locations, some of which correspond to control registers of the DMA circuitry. Address decode 520 provides explicit decode lines for each of the discrete control registers. Shadow RAM memory 524 is a 256 word by 16-bit memory, which thus spans all of the I/O address space.

There are four kinds of I/O registers—read/write, write only (control), status (read only) and "unused". When a read/write or read only register is referenced, the Shadow RAM is disabled. When a control address is written, the same data is also written into the Shadow RAM. A read of that same address causes the data to be read from the shadow RAM and made available to the 16-bit microprocessor 444, providing an indication of the current status of the control register. All addresses not used for DMA control are written and read from the Shadow RAM, making these addresses available as general purpose registers. Most of these registers are contained in DMA controller 526, which will be described in greater detail hereinbelow. The purpose of controller 526 is to provide the continuous sequence of 24-bit addresses on address bus 528 which are required to support DMA operation.

A unique sequence of addresses is required for each descriptor of each controller for both the read and the write mode. Thus, a total of 16 unique sequences are required. The range and length of each address sequence is specified to the DMA controller by writing into four registers. These registers are contained in the lowest 64 addresses of the I/O address space. Consider, for example, the registers associated with the DMA Controller 0, Descriptor 0 for write transfers.

Register 00—DMA Control (Read/Write)

This register is the DMA control for Descriptor 0 of Write Controller 0.

Bit 0—Device Write Termination

This bit, when active high, indicates the device has terminated the DMA write to memory operation. The termination may be early or at the last byte/word. This bit is generated from the Write Last Byte signal from the device interface.

Bit 1—Byte Write Termination

This bit, when active high, indicates the DMA write to memory operation for this descriptor terminated on an odd byte boundary. If the device terminated the transfer, this bit indicates the residual count in the descriptors is plus one half word. This bit is generated at the same time as the device write termination bit.

Bit 2 and 15-Not Used

These fourteen bits can be written and read from the Shadow RAM for diagnostic purposes.

Register 01—DMA Terminating Address (Read/Write)

This register contains the sixteen bit DMA terminating address for Descriptor 0 of Write Controller 0. This register can only be loaded with the word address of the desired buffer memory terminating address.

Register 02—Upper DMA Address Counter (Read/Write)

This register is an upper DMA address counter for Descriptor 0 of Write Controller 0. The lower 8 bits contain the most significant 8 bits of the 24 bit buffer memory address for the DMA operation. The upper 8 bits of this register are not used, but can be written and read from the Shadow RAM.

Register 03—Lower DMA Address Counter (Read/Write)

This register is a lower DMA address counter for Descriptor 0 of Write Controller 0. This 16-bit counter contains the least significant 16 bits of the 24 bit buffer memory address for the DMA operation.

This four-word pattern repeats for the remaining 15 sequences.

Consider now the case where the control registers of controller 526 have been loaded and there is data on the channel input 532. This appears in a synchronous byte format. To each byte is added a ninth bit of parity by parity generator 534. The first-in/first-out elastic buffer 536 provides the capability to buffer up to 16 bytes of data. This is sufficient to permit synchronous transfer at both the port input and at the central memory interface without overflow or underflow. Alternate bytes are captured in latches 540 and 542 to form a 16-bit word which is latched in latch 546.

Communication with Central Memory 100 is the same as that previously described. Bus arbitration 576 compares the contents of processor slot I.D. bus 132 with the processor I.D. switches 574. When the "MY SLOT" time arrives, the state of DMA key switches 564 is placed on the A or B key bus 134, via key buffer 568. Since the DMA is a 16-bit interface, this key is selected to be presented to either the A or B bus, depending on the connection of the common bus and read bus per FIG. 1. During the first half of the Central Memory cycle at MY SLOT time, the data from address bus 528 is placed on common bus 102 or 104, and during the second half of the cycle, the 16-bit write data 548 is placed on the bus. For transfers from Central Memory to the channel, the process is simply reversed. If at MY SLOT time there is sufficient space in FIFO 552, a read cycle of Central Memory is performed.

Address generation is as before, during the first half of the memory cycle. During the second half of the memory cycle, the read data appears from either bus 106 or 108 and is captured in latch 562. The output of this latch, a 16-bit word plus 2-bits of parity, is split into two bytes 558 and 560, each with their associated parity bit. These become the two inputs into multiplexor 556. This selection of multiplexor 556 is toggled at each byte time to disassemble the word into a serial byte format on data path 554. Data is clocked out of the FIFO to the channel out bus 550 at the channel synchronous rate, nominally 50 megabits per second.

DMA CONTROLLER

FIG. 8 shows a detailed block diagram of the DMA Controller 526 of FIG. 7. The aforementioned 64 I/O registers which define the 16 possible DMA sequences are comprised of dual port RAM memories 636 through 642. The control RAM 636 is a 16 word by 8-bit RAM where each word corresponds to one of the aforementioned control registers. Similarly, memory 638 contains the 16 registers associated with termination addresses 640 to 16 registers associated with the upper address and 642, the 16 registers associated with the lower address. The DMA is initialized by writing to these registers, via address bus 505 and data bus 507 on a register-by-register basis. Control register data is written, via multiplexor 632, while all other data is written via multiplexor 628. Port A is used for all I/O operations and for a read of any of the control registers. The A port data output is provided to the I/O read data bus 444. Based upon the selected controller, the descriptor and the mode, i.e., read or write, control 614 places a 4-bit address on bus 616 which propagates through multiplexor 622 to provide the port B address to all four RAM memories.

DMA operation is enabled by writing a selected bit pattern to register 52, the DMA Control Register. The control function of each bit of this register is as follows:

Bit 0—Enable Read Channel

This bit, when active high, enables the DMA read data channel for all controllers This bit must be conditioned with a valid read controller select, the selected controllers descriptors not empty and the enable read request active high to start a DMA transfer.

Bit 1—Enable Write Channel

This bit, when active high, enables the DMA write data channel for all controllers. This bit must be conditioned with the selected controller descriptors not empty and the Enable Write Request active high to start a DMA transfer.

Bit 2—50 MHz/100 MHz Not Mode

This bit, when active high, indicates to the DMA memory cycle request hardware that the slot access profile is set to 50 MHz for the DMA board. This bit, when active low, indicates to the DMA memory cycle request hardware that the slot access profile is set to 100 MHz for the DMA board.

Bit 3—Enable Segment Counter Use

This bit, when active high, enables use of the segment counter for read DMA transfers. When enabled and the segment counter equals zero the hardware will change controllers if directed to do so by the read controller selects. If this bit is active low the segment counter is not used and the read controller selects may change on each transferred.

Bit 4—Parity Select

This bit, when active low, selects odd parity to be checked by the hardware. This bit, when active high, selects even parity to be checked by the hardware.

Bit 5—Enable Loopback Mode

This bit, when active high, enables the connection of the read from memory data path to the write to memory data path at the device interface.

Bit 6—Enable Read Request

This bit, when active high, enables the read from memory request hardware on the DMA board. This bit must be enabled for any read DMA transfers to occur.

Bit 7—Enable Write Request

This bit, when active high, enables the Write to Memory Request hardware on the DMA board. This bit must be enabled for any write DMA transfers to occur.

Bit 8 thru 15—Not Used

The contents of each of the four control registers, i.e., one from each of RAM memories 636 to 642, as specified by the address on address bus 630, are available at the B port data out of each RAM. A 16-bit output 652 from the lower address RAM is combined with the 8-bit output 654 from the upper address RAM to form the 24-bit address 528. Output 652 provides one input to binary adder 644. The other input 656 is a hard-wired value of +2. Thus, the present address 652 +2 is captured in multiplexor latch 628. When the current central memory transfer is complete, a write operation is performed on RAM memory 642 and the value contained in latch 628 becomes the new address present at 652. Note that the addition is performed on only the lower 16 bits of the address which specify one 65K page of memory. As a consequence, a DMA sequence cannot be programmed to span a page boundary. Once a DMA sequence has been initiated, it proceeds automatically until there is a suspension of data or it reaches the termination address. Output 650 of a termination address RAM 638 contains the termination address. The current address 652 is compared to this value by comparator 648. Comparator 648 activates upon a match of the termination address and the current address. Line 608 is activated to cause control 614 to switch to the alternate descriptor and at the same time generate an Interrupt Request on line 501 to the 16-bit microprocessor. The new descriptor causes a new address to be generated on address bus 630 which points to a new set of control registers in the control RAMs. Thus, the DMA transfer can continue without interruption while the microprocessor updates the inactive descriptor If a level 8 interrupt is sensed, register 44 is read to determine the required control action.

The function or the meaning of each of the status bits of register 44 is as follows:

Register 44—Write DMA Controller Status (Read)

This request is used to determined the status of the write DMA controllers.

Bit 0—Write Controller 3 Descriptor 0 Full

This bit, when active high, indicates descriptor 0 of write controller 3 is "full". The description of full is that the descriptor has been loaded, the count is not equal to zero and the Device Write Termination bit in the descriptor control register is not active.

Bit 1—Write Controller 3 Descriptor 1 Full

This bit, when active high, indicates descriptor 1 of write controller 3 is "full". The description of full is that the descriptor has been loaded, the count is not equal to zero and the Device Write Termination bit in the descriptor control register is not active.

Bit 2—Write Controller 3 Descriptor Pointer

This bit, when active high, indicates Descriptor 1 is active and is the descriptor currently being used in the DMA operation. This bit, when active low, indicates Descriptor 0 is active and is the descriptor currently being used in the DMA operation. When first loading descriptors to start a DMA operation, the descriptor pointer is pointing to the descriptor that the hardware will use first. To determine which descriptor to load when a write controller service request level 8 interrupt is received, the descriptor full bits must be checked. If the pointer is to Descriptor 0 and the Descriptor 0 full bit is inactive, Descriptor 0 should be loaded. If the pointer is to Descriptor 0 and the Descriptor 0 full bit is active, Descriptor 1 should be loaded. If the pointer is to Descriptor 1 and the Descriptor 1 full bit is inactive, Descriptor 1 should be loaded. If the pointer is to Descriptor 1 and the Descriptor 1 full bit is active, Descriptor 0 should be loaded. The pointer bit and two full bits may be used as a skip value to determine what descriptor to fill.

Bit 3—Write Controller 3 Service Request

This bit, when active high, indicates Write Controller 3 has issued a level eight interrupt and is requesting service.

Bit 4—Write Controller 2, Descriptor 0 Full

Same description as bit 0, Write Controller 3, Descriptor 0 full.

Bit 5—Write Controller 2, Descriptor 1 Full

Same description as bit 1, Write Controller 3, Descriptor 1 full.

Bit 6—Write Controller 2 Descriptor Pointer

Same description as bit 2, Write Controller 3 descriptor pointer.

Bit 7—Write Controller 2 Service Request

Same description as bit 3, Write Controller 3 service request.

Bit 8—Write Controller 1 Descriptor 0 Full

Same description as bit 0, Write Controller 3, Descriptor 0 full.

Bit 9—Write Controller 1 Descriptor 1 Full

Same description as bit 1, Write Controller 3, Descriptor 1 full.

Bit 10—Write Controller 1 Descriptor Pointer

Same description as bit 2, Write Controller 3 descriptor pointer.

Bit 11—Write Controller 1 Service Request

Same description as bit 3, Write Controller 3 service request.

Bit 12—Write Controller 0 Descriptor 0 Full

Same description as bit 0, Write Controller 3, Descriptor 0 full.

Bit 13—Write Controller 0 Descriptor 1 Full

Same description as bit 1, Write Controller 3, Descriptor 1 full.

Bit 14—Write Controller 0 Descriptor Pointer

Same description as bit 2, Write Controller 3 descriptor pointer.

Bit 15—Write Controller 0 Service Request

Same description as bit 3, Write Controller 3 service request.

If a level 7 interrupt is sensed, register 45 is read to determine the required controlled action. The meaning of each status bit of register 45 is follows:

Register 45—Read DMA Controller Status (Read)

This register is used to determined the status of DMA read controller.

Bit 0—Read Controller 3 Descriptor 0 Full

This bit, when active high, indicates Descriptor 0 of Read Controller 3 is "full". The description of full is that the descriptor has been loaded and the count is not equal to zero.

Bit 1—Read Controller 3 Descriptor 1 Full

This bit, when active high, indicates Descriptor 1 of Read Controller 3 is "full". The description of full is that the descriptor has been loaded and the count is not equal to zero.

Bit 2—Read Controller 3 Descriptor Pointer

This bit, when active high, indicates Descriptor 1 is active and is the descriptor currently being used in the DMA operation. This bit, when active low, indicates Descriptor 0 is active and is the descriptor currently being used in the DMA operation. When first loading descriptors to start a DMA operation, the descriptor pointer is pointing to the descriptor that the hardware will use first. To determine which descriptor to load when a read controller service request level 7 interrupt is received, the "descriptor full" bits must be checked. If the pointer is to Descriptor 0 and the Descriptor 0 "full" bit is inactive, Descriptor 0 should be loaded. If the pointer is to Descriptor 0 and the Descriptor 0 full bit is active, Descriptor 1 should be loaded. If the pointer is to Descriptor 1 and the Descriptor 1 "full" bit is inactive, Descriptor 1 should be loaded. If the pointer is to Descriptor 1 and the Descriptor 1 "full" bit is active, Descriptor 0 should be loaded. The pointer bit and two full bits may be used as a skip value to determine what descriptor to fill.

Bit 3—Read Controller 3 Service Request

This bit, when active high, indicates Read Controller 3 has issued a level seven interrupt and is requesting service.

Bit 4—Read Controller 2 Descriptor 0 Full

Same description is bit 0, Read Controller 3, Descriptor 0 full.

Bit 5—Read Controller 2 Descriptor 1 Full

Same description as bit 1, Read Controller 3, Descriptor 1 full.

Bit 6—Read Controller 2 Descriptor Pointer

Same description as bit 2, Read Controller 3 descriptor pointer.

Bit 7—Read Controller 2 Service Request

Same description as bit 3, Read Controller 3 service request.

Bit 8—Read Controller 1 Descriptor 0 Full

Same description as bit 0, Read Controller 3, Descriptor 0 full.

Bit 9—Read Controller 1 Descriptor 1 Full

Same description as bit 1, Read Controller 3, Descriptor 1 full.

Bit 10—Read Controller 1 Descriptor Pointer

Same description as bit 2, Read Controller 3 descriptor pointer.

Bit 11—Read Controller 1 Service Request

Same description as bit 3, Read Controller 3 service request.

Bit 12—Read Controller 0, Descriptor 0 Full

Same description as bit 0, Read Controller 3, Descriptor 0 full.

Bit 13—Read Controller 0 Descriptor 1 Full

Same description as bit 1, Read Controller 3, Descriptor 2 full.

Bit 14—Read Controller 0 Descriptor Pointer

Same description as bit 2, Read Controller 3 descriptor pointer.

Bit 15—Read Controller 0 Service Request

Same description as bit 3, Read Controller 3 service request.

A DMA cycle may be executed every 160 nanoseconds to provide a 100 megabit bandwidth. Fifty megabit duplex operation is accomplished by alternating read and write cycles, i.e., changing the address on address bus 630 from read to write on each cycle. In similar manner, interleaved operations between two or more controllers can be performed to share the total 100 megabit potential bandwidth.

STORAGE PROTECT

FIG. 9 shows a detailed block diagram of the Bank 0 Storage Protection circuitry. The state of Bus/Bank Select line 138 determines the source of input data from multiplexor latches 600, 602 and 604. When line 138 is in the low state, the 4-bit A key field, from bus 134 is captured in latch 600 during the first phase of the memory cycle. At the same time, the 24-bit address field from A common bus 102 is captured in latch 602. During the second half of the same memory cycle, the 16-bit write field, also from A common bus 102, is captured in latch 604. Alternatively, when line 138 is in the high state, the B key bus field and B address and write data fields are captured.

Storage protection is active only when flip-flop 646 is set. The state of this flip-flop is controlled by the least significant data bit, D0, written to address $00810040_H$. A write to this address activates decode line 648 such that at time T60 AND gate 650 is enabled to clock flip-flop 646 to the state present on line 612, i.e., data bit 0. Once flip-flop 646 has been set, a subsequent write to this same address enables AND gate 652 to clear flip-flop 630, causing any previously registered memory fault condition to be reset. Multiplexor 634 selects one of two address fields from the 24-bit address present on internal address bus 608.

The output of multiplexer 634 provides a 12-bit address to the 4096 word by 4-bit RAM memory 636. During normal operation, decode 642 is low, causing a read operation. Read data from memory 636 appears on the 4-bit bidirectional data bus 614. The 4 bits of read data from RAM memory 636 and the 4 bits of key data from latch 600 are captured in latch 616 and appear on output buses 620 and 618, respectively.

If the key data and the RAM memory read data do not match, the output of comparator 622 is high. For all write cycles, decode 626 is also high. With flip-flop 646 set, any memory fault causes AND gate 627 to be enabled and at time T80, this state is captured in flip-flop 630. Once flip-flop 630 has set to register a Bank 0 memory fault on output line 632, feedback from the $\overline{Q}$ output to the flip-flop's "preset" input assures that it remains set until cleared by writing to address $00810040_H$.

The key code 0 is used only by the control processor to alter the key table stored in memory 636. This condition activates decode line 642, putting memory 636 in the write mode. It also enables the output on tri-state buffer 644 such that the lower four bits of data captured in latch 604 are written into the RAM memory cell associated with the address then latched in 602. A Bank 0 memory fault clocks tri-state latches 638, 640, 654 and 656 to cause the key field, the upper eight bits of address and lower 16 bits of address to be captured, respectively. This enables the Nucleus Processor or any other processor in the system to execute fault isolation diagnostics. A read of address $00810050_H$ accesses the data in latches 638 and 640 on Bank 0 read bus 224, while a read of address 00810052 accesses the data in latch 654 and 656 on the Bank 1 read bus 226. Bank 1 storage protect circuitry is identical to that shown and described in conjunction with FIG. 9, except for the elimination of flip-flop 646 and AND gates 650 and 652.

ACCESS CONTROL

Figure 10:
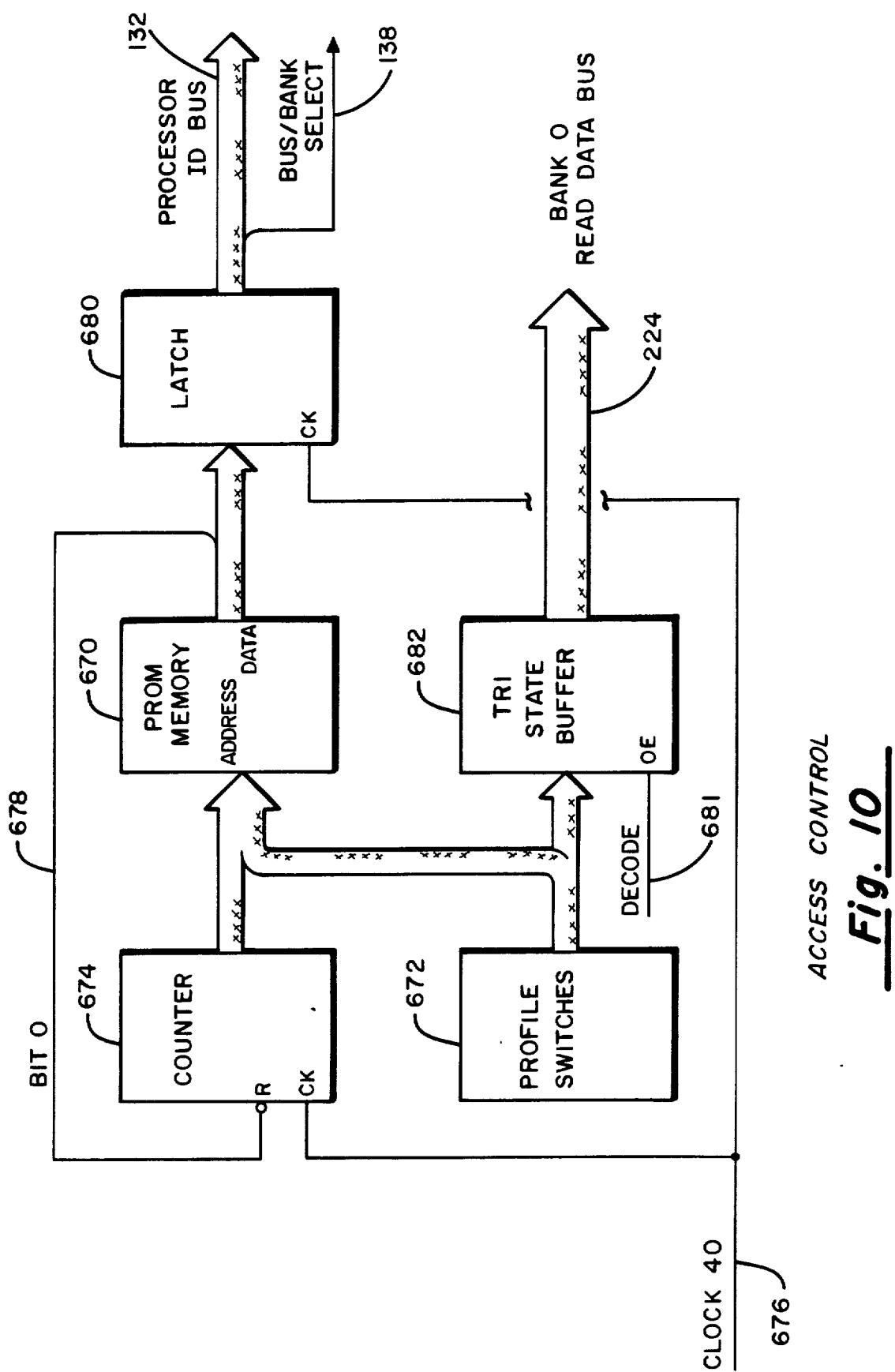
FIG. 10 shows a detailed block diagram of the access control circuitry portion of the node control of FIG. 3.

Table A, supra, identified a hypothetical access of processors to buses for the various time slots. This time slot assignment is referred to as the "system profile". Generally, it is desirable to provide field selectability among a number of legal profiles while, at the time, preventing the selection of an illegal profile. FIG. 10 shows a detailed block diagram of the access control circuitry which accomplishes this. The Access Control circuitry includes a memory 670 which preferably is a 256 word 8-bit programmable read only memory containing 16 possible system profiles, each profile being 16 consecutive words. The lower 4 bits of address are provided by 4-bit time-slot counter 674, which is clocked by the "T 40" signal, such that a new address is generated for each 80 nanosecond time-slot. The data read from memory 670 is captured in latch 680, the output of which is the processor I.D. bus 132, and a portion of that bus comprises the Bus/Bank Select line 138. The profile switch block 672 contains four switches, each one corresponding to one of the four higher order address bits for memory 670. Thus, any one of the 256 combinations that the switches in block 672 can be set to corresponds to a different profile, i.e., a different sequence of processor I.D. bus signals.

Address bit 0 from memory 670 controls the reset of counter 674. This allows profile sequences of less than 16 to be implemented. For example, a profile sequence of 8 time-slots would have address bit 0 programmed to be "0" for the first 8 addresses and a "1" for the ninth address to cause a reset of counter 674. A read of address $00810020_H$ activates decode line 681 to allow the state of profile switches 672 to be read, via tri-state buffer 682 and over Bank 0 read data bus 224.

INTERRUPT CONTROL

Figure 11A:
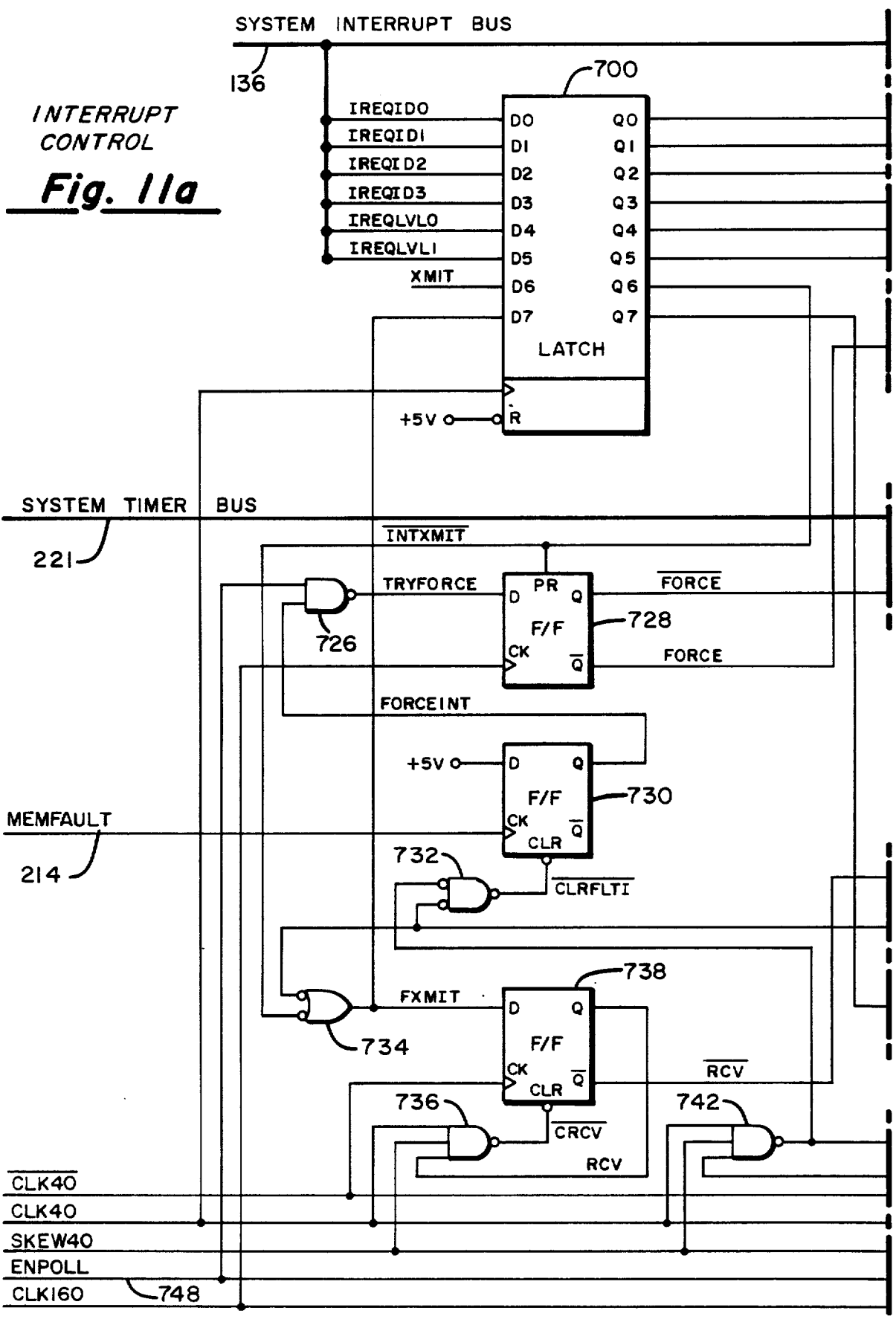

FIGS. 11a and 11b, when arranged as in show a detailed block diagram of the Interrupt Control block 216 of FIG. 3. Each processor in the system may be both a source and a destination of interrupts. Interrupts are routed between processors via the system interrupt bus 136. This bus is controlled in a sequential manner polling for inputs and distributing outputs. A poll cycle is made up of four 80 nanosecond subcycles. Each poll takes 320 nanoseconds. Up to 16 processors may be polled with each processor able to process an interrupt every 5.12 microseconds. System interrupt bus 136 is comprised of the following lines:

1. A sync signal that indicates a start of a new polling sequence. This signal is active during the first subcycle.
2. Four interrupt identifier signals designated IREQID 0 through 3.
3. Two priority level signals, "level 0" and "level 1" which are encoded to provide four levels of priority 00 being the lowest, and 11 being the highest.
4. A $\overline{\text{XMIT}}$ signal which is asserted by the originating processor to indicate an interrupt.
5. A $\overline{\text{RCV}}$ line which is asserted by the interrupt control to relay or echo the interrupt.

During the first polling subcycle, the Interrupt Control asserts the sync signal along with the 4-bit interrupt identifier code. During the second subcycle, only the processor with an I.D. matching the polled interrupt identifier is eligible to present an interrupt. If the eligible processor has an interrupt to present, it will activate the $\overline{\text{XMIT}}$ signal and also present the I.D. code of the destination processor. During the second subcycle, the interrupting processor also places the priority level of the interrupt on the interrupt level lines. The priority levels, in binary, are 00, the lowest priority 01, 10 and 11, the highest priority level. If and only if a processor has originated an interrupt on the second cycle, the Interrupt Control will, during the third cycle, assert the $\overline{\text{RCV}}$ line and relay the interrupt I.D. and level signals present during the second subcycle. During the fourth subcycle, the interrupt control again places "FROM" processor identifier, i.e., the same I.D. code used in the first subcycle, on the interrupt request I.D. line 0 through 3. Polling of interrupts is activated by enabling the enable poll line 748. This is accomplished by writing a one to memory address $00810040_H$. Polling may, at any time, be disabled by writing a 0 to this same address. With polling enabled, the "160 clock" sets flip-flop 746 to activate the sync line which enables the outputs of the A section of the dual 4-bit tri-state buffer 724. This causes the polling interrupt request I.D. code to be placed on the system interrupt bus 136. The source of this I.D. code is the four least significant bits of the system timer bus 221 (FIG. 3). It should be recalled that the system timer is incremented by "clock 160". Latch 700 is clocked at the beginning of every polling subcycle.

The destination code and priority level generated by the interrupting processor during the second subcycle is captured in latch 700. It propagates through AND/OR logic gates 702 through 712 and on the trailing edge of the "40 clock", it is also captured in latch 714. During the third polling subcycle, the $\overline{\text{RCV}}$ line goes low, and the contents of latch 714 are presented on the request I.D. and priority level lines of the system interrupt bus. During the fourth polling subcycle, flip-flop 740 is set enabling the B section of dual 4-bit tri-state buffer 724. The source interrupt request I.D. is again presented on the system bus. This originates from the system timer bus 221, propagating through AND gates 716 through 722.

During normal operation, Interrupt Control neither originates nor receives interrupts. In the event of a memory fault from the storage protection circuitry, the Interrupt Control generates a forced interrupt of the highest priority, i.e., 11. Because of the criticality of this fault, this interrupt uses the first available interrupt polling slot and is immediately impressed on the interrupt bus.

A memory fault on line 214 clocks flip-flop 730 to the set state. If polling is enabled, AND gate 726 is thus enabled and on the next "160 clock" time flip-flop 728 is cleared. This forces the output of AND gates 716 to 722 to all "0's" and forces a request I.D. code of 0000 onto the system interrupt bus 136. This I.D. code is reserved for Interrupt Control, thus no other processor will attempt to respond. AND gates 702 through 708 are disabled causing a 000 I.D. code to be forced into latch 714. The output of OR gates 710 and 712 are forced to a "1" to cause the highest priority interrupt level, 11, to also be captured in latch 714. AND gates 716 through 722 are disabled forcing a request I.D. code of "0000". The effect of this force is to override any other processor interrupt activity to assure that the memory fault is immediately processed.

INTERRUPT PROCESSOR

FIGS. 12a-1, 12a-2 and 12b together show a detail diagram of the Interrupt Processor 376 of FIG. 5. The function of the Interrupt Processor is to capture all interrupts generated on the system interrupt bus, sort them by level, present the interrupt in a priority encoded form to microprocessor 350 via bus 378 and provide for the orderly transfer of interrupt data to the microprocessor, via data bus 362. It is further responsible for transmitting interrupts generated by microprocessor 350 in accordance with the polling protocol.

Consider first the case where the Interrupt Processor is originating the interrupt. Microprocessor 350 initiates the interrupt by writing to address 00810040$_H$. This activates P1 PROC. INT. REQ. line 806, which clocks tri-state latch 804 to capture the lower seven bits $D_0$–$D_6$ data word. These bits, starting from least significant to most significant, are the interrupt request I.D. 0 through 3, level 0, level 1, and $\overline{XMIT}$. This interrupt request on line 806 also sets flip-flop 808 and presents a "1" to bit D0 of latch 800 via line 810. Latch 800 is clocked at the beginning of each polling subcycle and in addition to DO, captures on inputs $\overline{D1}$ through D8, the interrupt request I.D. 0 through 3, sync, level 0, level 1, and $\overline{RECV}$, respectively. The B inputs of comparator 802 are connected as follows: B0 is hard-wired to the "1" state, B1 and B5 are hard-wired to the "0" state, and comparator inputs B2, B3, B4 are connected to the processor I.D. bus 380. Thus, when Q0 of latch 800 is a "1", indicating an interrupt request from processor 1 is pending AND input A1 is a "0" and inputs $\overline{A2}$, A3, A4, correspond to the processor I.D., and the $\overline{SYN}$ is low, the A and B inputs match and the output of comparator 802 goes low. This condition only happens then when there is an Interrupt Request pending and processor P1 has reached its turn in the polling cycle. When the output of comparator 802 goes low, the contents of latch 804 are presented on the system interrupt bus 136. At the same time, flip-flop 808 is cleared the interrupt is now on the system interrupt bus 136 and the Interrupt Control circuit will manage the distribution of the interrupt as previously described. With flip-flop 808 cleared, on the next subcycle, clock line 812 goes low, disabling comparator 802. The system will not respond again until the P1 processor generates the next Interrupt Request on line 806.

Next, consider the case where the P1 processor is the destination of an interrupt. Recall that the Interrupt Control asserts the $\overline{RCV}$ signal during the third subcycle to indicate that the I.D. field contains a destination code of the interrupt. The B inputs of comparator 816 are connected as follows: B0 and B4 are hard-wired to 0 while B1, B2, and B3 are connected to the processor I.D. bus 380. When the data from the third subcycle has been captured in latch 800, the output Q8, line 814, will be low. If, at the same time, I.D. 0, 1 and 2, correspond to processor I.D. 1, 2 and 3 and I.D. 3 is also "0", the output of comparator 816 will be low. At time 40 when CLK 409 goes high, flip-flop 822 will be set and flip-flops 818 and 820 then capture the interrupt level. Twenty nanoseconds later, AND gate 826 is enabled. NAND gates 828 through 834 are used to decode the 2-bit level code contained in flip-flops 818 and 820 into a discrete signal for level 0 through level 3, respectively. By this time, the data from the fourth polling subcycle has been latched into latch 800 and the I.D. field now contains the code associated with the originator of the interrupt.

Circuits 854 through 860 (FIG. 12b) are identical interrupt receivers, one provided for each interrupt level. If the received interrupt level is "0", line 836 goes low to set the 16-bit addressable latch 862 and set the bit designated by the request I.D. field captured in latch 800. At the same time, flip-flop 870 is preset, causing the $\overline{Q}$ output line 871 to go low. Priority encoder 872 encodes the binary value of the highest order D-input which is a "0" into a 3-bit code present in outputs Q0, Q1, Q2. Without any interrupt activity, the normal state of interrupt bus 378 is 000. A level 0 interrupt sets this to 001, indicating interrupt to the P1 microprocessor 350.

On the next microprocessor instruction cycle, the control is automatically vectored to the interrupt processing routine for level 0 interrupts. Then microprocessor determines the source of the interrupt by reading address 80200000 to 8020000C. This presents a 00 to the S0 1 inputs decoder B24 and causes the $\overline{Enable}$ to go low, thus causing output Q0 line 846 to go low. When line 846 goes low, the contents of addressable latch 862 are captured in 16-bit tri-state latch 864.

SOFTWARE CONTROL STRUCTURE

Figure 13:
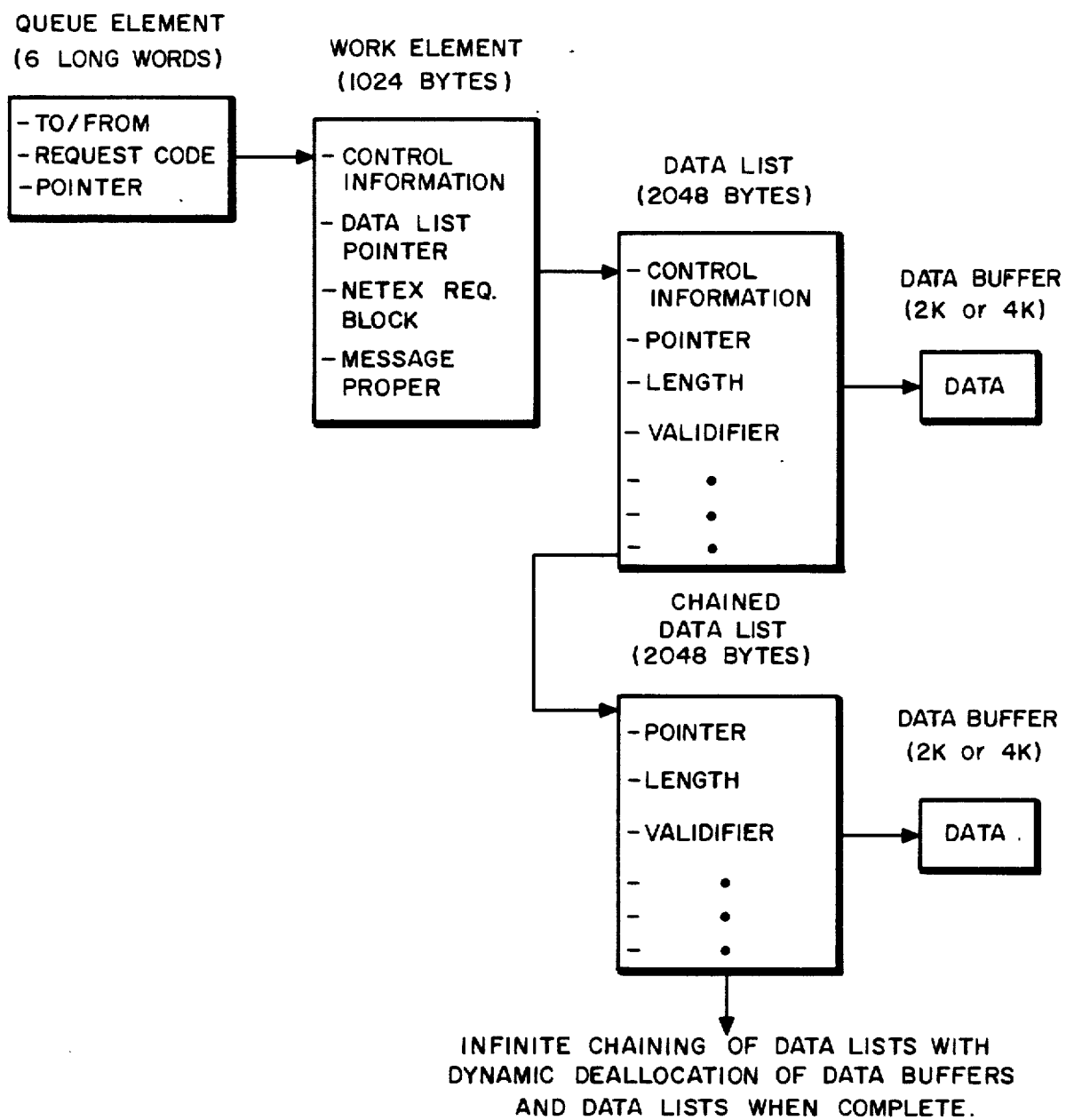
FIG. 13 depicts the organization of the data linkage structure utilized.

The operation of the network adapter described herein depends upon efficient high-speed interprocessor communication. The unique hardware features which support this operation have been previously described. To this is added a software control structure based upon the data linkage structure shown in FIG. 13. All interprocessor communication uses a part, if not all, of this linkage structure. Associated with each processor within the Central Memory 100 of the network adapter are two queue lists—an inbound (read only) list and an outbound (write/read) list. The lists are organized in a circular manner with a control block to provide a pointer to the next open entry point of a list. For any processor arbitrarily designated as "A" to communicate with another processor arbitrarily designated as "B", processor A first reads the control block associated with the inbound queue list of processor B, enters a new queue element at the next entry point on said list and then generates an appropriate level interrupt to processor B. When interrupted, processor B removes the queue element from processor A from the inbound queue list and resets the control block pointer. In the queue element is a To/From field which identifies that this particular queue element is TO processor B FROM processor A. Another field, the Request Code field, provides for a number of predefined messages which may be passed. Certain request codes may be used to define specific operations, such as, "allocate central memory buffers", "de-allocate central memory buffers" or "transfer ownership of a data list" or a "log out". Certain request codes require no associated data and, in this case, the queue element itself comprises the message passed between processor A and B. Certain other request codes require associated data to be passed. For this instance, a pointer field in the queue element points to a 1024 byte region of Central Memory 100 which comprises the "work element".

Within the work element are a plurality of fields to pass control information, including a pointer to another element of the data linkage structure, e.g., the data list, a Netex Request Block, the function of which will be described later, and space for a more complex message than can be provided in the request code field. For certain request codes, the queue element and the work element together comprise the passed message. For the specific request code associated with transfer ownership of data list, the data list pointer in the associated work element points to the first 2048 byte block of a chained data list. Within each data list block is a pointer directed at an associated data buffer which contains the message data flowing through the network adapter. At the end of each data list block is a pointer to the next data list block allowing infinite chaining of the data lists and associated data buffers.

The data linkage structure thus provides the means to route inbound messages to one Interface Processor to the designated outbound Interface Processor. Although the system provides hardware and software mechanisms for all processors to directly communicate with each other, the interface controllers typically communicate through the Nucleus Processor. The manner of interprocessor communication typically associated with message traffic is as follows: The Interface Processors generate queue elements for the Nucleus Processor to request the allocation of buffer memory space. For each request, the Nucleus Processor returns a queue element with a link address to the first page of memory allocated. Each page will have a link address to the next page in the first double word of the page.

Using the work element structure, Interface Processors identify to the Nucleus Processor the destination address of inbound messages. The destination address may include a combination of logical physical and global addresses corresponding to devices located anywhere on a total telecommunications network. Thus, for every message, there is an Interface Processor which is either itself the destination of the message or a route on the way to that destination. The Nucleus Processor, by means of a route table, determines the destination or route Interface Processor. By means of the data linkage structure, the Nucleus Processor links the destination or outbound Interface Processor to the same buffer memory space in central memory as the associated inbound Interface Processor on a message-by-message basis. Concurrent with the allocation of buffer memory space, the Nucleus Processor also updates the storage protection memory to provide a write access capability to the requesting processor for the allocated buffer memory. Each 2K word element block of memory is write protected as follows: The first 1K block can be written only by the sending processor while the second 1K block can be written only by the receiving processor. When the message buffered into an allocated page has been transmitted, the page is deallocated, i.e., control is returned from an Interface Processor to the Nucleus Processor.

NETWORK EXECUTIVE PROCESSOR

The network adapter of the present invention can accommodate additional processors identical in structure to the Nucleus Processor, but which are programmed to perform specific application functions within the network adapter described herein. An example of such an application function is the network executive function normally performed in a host device. The purpose of the network executive (Netex) is to allow application programs in separate host devices to communicate with one another without regard to the actual network configurations. It facilitates such applications as file transfer, job transfer and transaction processing in either a single or multi-vendor environment at or near native channel speeds and on a real-time demand basis.

The international standards organization open system architecture reference model for data communications has identified a seven layer standard protocol for data communications. This is a layered protocol, with each level communicating only directly to the level above or the level below. The highest level, i.e., the application level, communicates only with the session level. The session level communicates in a layered fashion with the other five lower levels, the lowest level being the physical media. The Netex function conforms to the session level of this standard. This enables application programs to address other applications by a symbolic name to conduct communications. It further allows multiple application programs running in a given host to simultaneously access the system and allows concurrent communication with devices distributed over the entire communications system.

The application program is insulated from all issues of routing full control, error detection and correction. Furthermore, an application program may be run anywhere on the network and achieve identical results. When this function is performed in a main frame host, it typically occupies a significant fraction of the host throughput capability. However, when the same function is done within the present network adapter, it can be performed much more efficiently with significantly less hardware, i.e., a 32-bit microprocessor, by virtue of its position in the system. The Netex Processor benefits from the efficient interprocessor communications system devised to handle the message traffic, i.e., the high-speed interrupt bus and the data linkage structure. The network executive control function is managed by means of the Netex request block (NRB). An application program, running in a host, generates session level commands which are passed to a Netex driver also running in the host. The Netex driver converts the session call into a network request block, which contains all of the parameters required to define a message session between two communicating application programs.

The network request block is received from the host by the associated Interface Processor which passes it to the Netex Processor by means of a queue element and associated work element. The Interface Processor transfers the Netex request block to the Netex Processor by means of a queue element and associated work element. The Netex request block is analyzed by the Netex Processor to determine, among other things, the direction of data transfer, the type of code conversion to be performed (if required), how to segment data elements of parameter data when performing a rate operation from the host on a transmit NRB command and the manner in which the host is communicated upon completion of a message session. Once the Netex Processor has interpreted the Netex request block, it manages the details of message traffic to achieve the same results as if the network executive function had been performed within the host computer.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A communications network adapter comprising:

(a) central random access buffer memory means for storing data at addressable locations, said buffer memory means being partitioned into first and second independently and concurrently operating interleaved banks;

(b) first and second common bus means selectively connectable on an alternating basis to said first and second banks for providing, on a time multiplexed basis, address representing signals and data representing signals to said buffer memory means for storing said data representing signals therein;

(c) first and second read data bus means selectively connectable on an alternating basis to said two banks for carrying data representing signals read out from the memory locations in said buffer memory means specified by said address representing signals carried by said first and second common bus means, each of said first and second common bus means and read data bus means having a finite bandwidth measurable in bits per second;

(d) a plurality of processing means comprising nodes individually coupled to said first and second common buses and to said read data buses, certain ones of said plurality of processing means having input/output means for communication with digital devices connected thereto; and (e) node control means coupled to said first and second common bus means and to said first and second read data bus means, said node control means including memory access control means for synchronously and cyclically connecting alternate ones of said first and second banks to said first and second common bus means and said first and second read data bus means, said node control means further including broadcast means for broadcasting a processor slot I.D. number to each of said plurality of processing means, said broadcast means having programmable read-only memory slot means for storing a plurality of processor I.D. words defining system profiles, addressing means including counter means and preset switching means coupled to said programmable read-only memory for reading out said words defining system profiles as said counter means is advanced, clock signal generating means for applying regularly occurring timing signals to said counter means to sequentially advance said counter means to read out processor slot I.D. words from said programmable read-only memory in a desired sequence, and a processor slot I.D. bus coupling said processor I.D. words from said programmable read-only memory means to said plurality of processing means, and means for selectively assigning access time slots to said plurality of processing means so that the total aggregate bandwidth of said first and second common bus means and read data bus means is allocated to said plurality of processing means on a predetermined, non-conflicting, need basis.

2. The communications network adapter as in claim 1 and further including first and second storage protection logic means in said node control means individually connected to each of said first and second banks, said first and second storage protection logic means comparing said address representing signals originating from one of said plurality of processing means and present on said first and second common bus means to a predetermined key I.D. assigned to said one of said plurality of processing means for generating a fault interrupt signal when access to an unauthorized range of central memory addresses for said one of said plurality of processors is attempted.

3. A communications network adapter comprising:

(a) central random access buffer memory means for storing data at addressable locations, said buffer memory means being partitioned into first and second independently and concurrently operating interleaved banks;

(b) first and second common bus means selectively connectable on an alternating basis to said first and second banks for providing, on a time multiplexed basis, address representing signals and data representing signals to said buffer memory means for storing and data representing signals therein;

(c) first and second read data bus means selectively connectable on an alternating basis to said two banks for carrying data representing signals read out from the memory locations in said buffer memory means specified by said address representing signals carried by said first and second common bus means, each of said first and second common bus means and read data bus means having a finite bandwidth measurable in bits per second;

(d) a plurality of processing means comprising nodes individually coupled to said first and second common buses and to said read data buses, certain ones of said plurality of processing means having input/output means for communication with digital devices connected thereto;

(e) node control means coupled to said first and second common bus means and to said first and second read data bus means, said node control means including memory access control means for synchronously and cyclically connecting alternate ones of said first and second banks to said first and second common bus means and said first and second read data bus means, said node control means further including broadcast means for broadcasting a processor slot I.D. number to each of said plurality of processing means, said broadcast means having programmable read-only memory slot means for storing a plurality of processor I.D. words defining system profiles, addressing means including counter means and preset switching means coupled to said programmable read-only memory for reading out said words defining system profiles as said counter means is advanced, clock signal generating means for applying regularly occurring timing signals to said counter means to sequentially advance said counter means to read out processor slot I.D. words from said programmable read-only memory in a desired sequence, and a processor slot I.D. bus coupling said processor I.D. words from said programmable read-only memory means to said plurality of processing means; and means for selectively assigning access time slots to said plurality of processing means so that the total aggregate bandwidth of said first and second common bus means and read data bus means is allocated to said plurality of processing means on a predetermined, non-conflicting, need basis; and (f) interrupt control means in said node control means for generating a timed sequence of interrupt identifier codes with interrupt bus means coupling said interrupt control means to said plurality of processing means for transmitting said interrupt identifier codes to each of said plurality of processing means, means in each of said processing means for decoding a different one of said interrupt identifier codes assigned to it for allowing any of the plurality of processing means responding to its interrupt identifier code to place on said interrupt bus means an interrupt request and a processor identifier code for identifying a destination processor to which said interrupt request is directed, and interrupt processor means coupled to said interrupt bus means for receiving said interrupt requests and said processor identifier codes of the destination processors for routing interrupt data to identified ones of said plurality of destination processors in accordance with a predetermined priority assignment.

4. The communications network adapter as in claim 3 wherein said interrupt processor means includes a dedicated storage means for storing at addressable locations route maps containing priority levels, destination and origin information of the interrupting and interrupted ones of said plurality of processing means.

* * * * *